(12) United States Patent
Jones et al.

(10) Patent No.: US 7,493,278 B2
(45) Date of Patent: Feb. 17, 2009

(54) METHOD AND SYSTEM FOR ANALYZING A CAPITAL STRUCTURE FOR A COMPANY

(75) Inventors: Emerson P. Jones, Greenwich, CT (US); Erol Hakanoglu, New York, NY (US)

(73) Assignee: Goldman Sachs & Co., New York, NY (US)

( * ) Notice: Subject to any disclaimer, the term of this patent is extended or adjusted under 35 U.S.C. 154(b) by 735 days.

(21) Appl. No.: 10/676,056

(22) Filed: Sep. 30, 2003

(65) Prior Publication Data
US 2005/0004854 A1    Jan. 6, 2005

Related U.S. Application Data

(60) Provisional application No. 60/414,735, filed on Sep. 30, 2002.

(51) Int. Cl.
*G06Q 40/00*    (2006.01)
(52) U.S. Cl. .................. 705/36 R; 705/35; 705/36 T
(58) Field of Classification Search ............... 705/36 R
See application file for complete search history.

(56) References Cited

U.S. PATENT DOCUMENTS

| | | | |
|---|---|---|---|
| 5,704,045 | A | 12/1997 | King et al. |
| 5,742,775 | A | 4/1998 | King |
| 5,802,501 | A | 9/1998 | Graff |
| 6,061,662 | A * | 5/2000 | Makivic ............ 705/36 R |
| 6,148,293 | A | 11/2000 | King |
| 6,167,384 | A | 12/2000 | Graff |
| 6,192,347 | B1 | 2/2001 | Graff |
| 6,278,981 | B1 | 8/2001 | Dembo |
| 6,321,212 | B1 | 11/2001 | Lange |
| 6,546,375 | B1 | 4/2003 | Pang et al. |
| 7,222,095 | B2 | 5/2007 | Squyres |

(Continued)

OTHER PUBLICATIONS

Intermediate Accounting by Loren Nikolai and John Bazley, PWS-Kent Publishing Company, 5th Edition, 1991, pp. 1183-1205.*

(Continued)

*Primary Examiner*—Shahid R Merchant
(74) *Attorney, Agent, or Firm*—Greenberg Traurig, LLP

(57) ABSTRACT

Various embodiments of the present invention relate to methods and systems for analyzing a capital structure for a company (e.g., a public corporation). More particularly, one embodiment of the present invention relates to a decision making tool for analyzing a company's capital structure, which decision making tool may include: (1) Economic EPS, wherein Economic EPS and its volatility may capture the cost/risk trade-off of all fixed income and equity-related alternative capital structures; and (2) Capital Structure Efficient Frontier, wherein a company should strive to bring its capital structure to the efficient frontier of strategies with the highest EPS for given levels of EPS risk. Of note, the Economic EPS and the Capital Structure Efficient Frontier methodologies of the present invention provide a unifying framework in which to analyze a company's capital structure (e.g., for identifying and implementing the economically optimal solutions to a company's capital structure challenges). Apart from the global view of the company's capital structure, this framework can be used as a decision-making tool for analyzing and comparing specific restructuring transactions (including, but not limited to): new financing, share repurchase, liability management, bank capital optimization, and/or tax-driven hybrid equity issuance.

14 Claims, 19 Drawing Sheets

U.S. PATENT DOCUMENTS

| | | |
|---|---|---|
| 7,251,627 B1 | 7/2007 | Vass |
| 2002/0042770 A1 | 4/2002 | Slyke et al. |
| 2002/0046144 A1 | 4/2002 | Graff |
| 2002/0065755 A1 | 5/2002 | Shlafman et al. |
| 2002/0075007 A1 | 6/2002 | Ayache |
| 2002/0099640 A1 | 7/2002 | Lange |
| 2002/0103738 A1 | 8/2002 | Griebel et al. |
| 2002/0147670 A1 | 10/2002 | Lange |
| 2002/0178101 A1 | 11/2002 | Swift |
| 2003/0014337 A1 | 1/2003 | Matthews et al. |
| 2003/0023325 A1 | 1/2003 | Chen et al. |
| 2003/0028418 A1 | 2/2003 | Wong et al. |
| 2003/0036988 A1 | 2/2003 | James |
| 2003/0046203 A1 | 3/2003 | Ichihari et al. |
| 2003/0069817 A1 | 4/2003 | Graff |
| 2003/0078870 A1 | 4/2003 | Daler et al. |
| 2003/0101125 A1 | 5/2003 | McGill et al. |
| 2003/0115128 A1 | 6/2003 | Lange |
| 2003/0130941 A1 | 7/2003 | Birle, Jr. et al. |
| 2003/0135436 A1 | 7/2003 | Birle, Jr. et al. |
| 2003/0135446 A1 | 7/2003 | Birle, Jr. et al. |
| 2003/0236758 A1 | 12/2003 | Lange |
| 2004/0006520 A1 | 1/2004 | Birle, Jr. et al. |
| 2004/0177016 A1 | 9/2004 | Jones et al. |
| 2005/0004857 A1 | 1/2005 | Schwarz et al. |
| 2005/0021435 A1 | 1/2005 | Hakanoglu et al. |

OTHER PUBLICATIONS

Sams teach yourself Excel 97 in 10 minutes by Jennifer Fulton, Sams, 1998, pp. 152-157.*

GAAP 2000, Interpretation and Application of Generally Accepted Accounting Principles 2000 by Patrick R. Delaney, Barry J. Epstein, James R. Adler and Michael F. Foran, John Wiley & Sons, Inc, pp. 735-756.*

ISDA Letter to Mr. Timothy Lucas, Director of Research and Technical Activities, FASB, Apr. 30, 2001.

The Analyst's Accounting Observer Letter to Mr. Timothy Lucas, FASB, May 3, 2001.

Six Batch of Proposed IAS 39 Implementation Guidance Questions and Answers, Draft issued for comment on Jun. 22, 2001.

Exposure Draft of Proposed Amendments to IAS 32 and IAS 39, dated 2002.

* cited by examiner

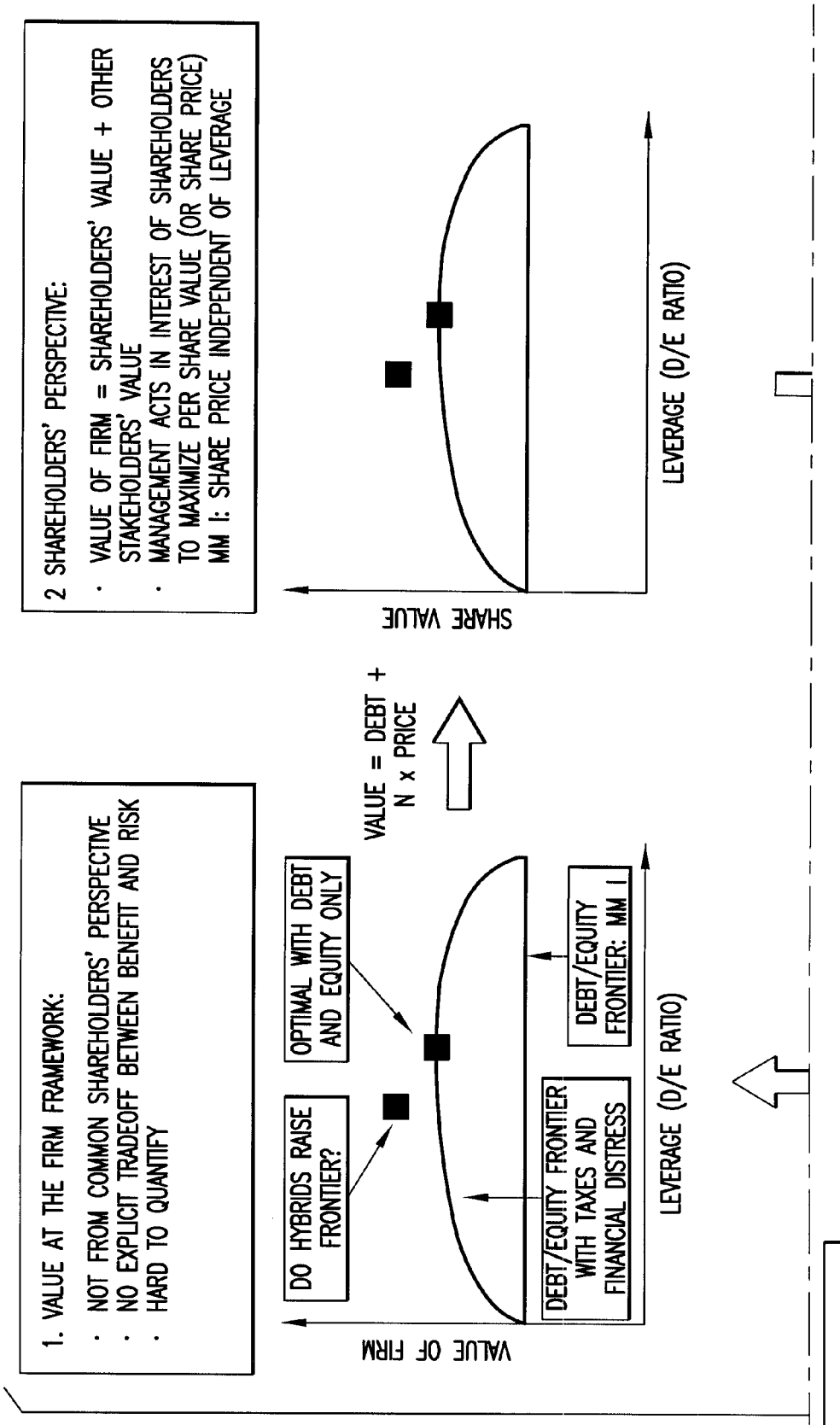

METHOD AND SYSTEM FOR ANALYZING A CAPITAL STRUCTURE FOR A COMPANY

CROSS-REFERENCE TO RELATED APPLICATIONS

This application claims the benefit under 35 U.S.C. 119(e) of U.S. Provisional Application Ser. No. 60/414,735, filed Sep. 30, 2002.

FIELD OF THE INVENTION

Various embodiments of the present invention relate to methods and systems for analyzing a capital structure for a company (e.g., a public corporation).

More particularly, one embodiment of the present invention relates to a decision making tool for analyzing a company's capital structure, which decision making tool may include:

Economic EPS: Economic EPS (hereinafter sometimes referred to as "Expected EPS" or "EEPS") and its volatility may capture the cost/risk trade-off of all fixed income and equity-related alternative capital structures, or securities (e.g., hybrid securities such as, for example, convertible securities).

Capital Structure Efficient Frontier: A company should strive to bring its capital structure to the efficient frontier of strategies with the highest EPS for given levels of EPS risk.

In another embodiment, the present invention may aid in the design and utilization of innovative financing products such as, for example (which examples are intended to be illustrative and not restrictive) Zero-put Contingent Convertibles (CUBZ/TUBZ/PLANZ) and Zero-coupon Continent Convertibles (STARZ) that expand the capital structure efficient frontier (e.g., by providing a better trade-off between EPS and EPS risk).

Of note, the Economic EPS and the Capital Structure Efficient Frontier framework/methodologies of the present invention provide a unifying framework in which to analyze a company's capital structure (e.g., for identifying and implementing the economically optimal solutions to a company's capital structure challenges). Apart from the global view of the company's capital structure, this framework can be used as a decision-making tool for analyzing and comparing specific restructuring transactions (including, but not limited to): new financing, share repurchase, liability management, bank capital optimization, and/or tax-driven hybrid equity issuance.

For the purposes of the present application the term "entity" is intended to refer to any type of company, organization, or group.

Further, for the purposes of the present application the term "security" is intended to refer to an instrument evidencing debt and/or ownership of asset(s).

BACKGROUND OF THE INVENTION

Earnings per share has conventionally been used as a tool for distinguishing the effective cost of debt versus equity.

However, hybrid securities pose a challenge for evaluating earnings per share. For certain financing alternatives, such as convertible bonds and stock options, for example, the impact on earnings and shares outstanding may change over time. A convertible bond, for example, generates tax-deductible interest expense until it is converted into a fixed or variable number of shares. It would seem that for the debt part of its life, a convertible bond reduces earnings; and for the equity part of its life, it increases shares. In an attempt to reconcile this dual nature of hybrid securities, it is believed that the current required accounting treatment is based upon "diluted EPS", which requires EPS to be calculated as the worse of two alternatives (see SFAS No. 128, paragraphs 11-39):

1) Basic EPS.
2) Same as basic EPS, except (a) the denominator is increased to reflect the potential number of additional shares, and (b) the numerator is adjusted as if the dividends and interest on the convertible had never been recognized.

In the case of convertible bonds, this corresponds to the if-converted method of accounting. In the case of outstanding call options on a company's stock, the increase in the denominator is calculated based upon the treasury stock method, as the intrinsic value of the option divided by the current market share price. These accounting rules for calculating diluted EPS essentially classify hybrids as either earnings-reducing (debt) or share-increasing (equity), without any assessment of how likely it is that the hybrid behaves as one or the other. Although it is a calculable and unambiguous accounting quantity, it is clear that diluted EPS does not accurately represent the economics for existing shareholders, i.e., how much of a given period's earnings each existing shareholder is entitled to.

Consider, for example, the impact of issuing a convertible bond on existing shareholders. These shareholders realize that earnings from the current year are not entirely their own. If some of those earnings are retained, contracted future shareholders (e.g., convertible bond holders) will be entitled to a piece of the pie. Some complications arise in determining how much remains for each existing shareholder. First, in many cases, it is unclear whether the bond will ever be converted to equity. Second, even if it is eventually converted, the number of shares may be uncertain (it may be dependent, for example, on the share price). The if-converted method assumes that convertible bond holders will become shareholders regardless of the likelihood of such an event. This accounting method does not capture the expected increase in number of shares nor its uncertainty. Third, interest paid to convertible bond holders is no longer available to distribute to existing shareholders. It seems inaccurate, therefore, to add interest payments back into the numerator as required by the if-converted method. Fourth, and finally, equity dividends paid to existing shareholders are not shared with future shareholders. Only retained earnings are shared. If a company distributed all of its earnings to existing shareholders through dividends, then future shareholders would have no claim on the earnings and would therefore not dilute earnings per share. Equity dividend policy does matter (the initial pricing of the convertible bond issuance would, of course, reflect a company's dividend policy).

These flaws make diluted EPS a poor tool for making economically based decisions regarding hybrid securities. In order to capture the economic consequences of hybrids more accurately, it is necessary to depart from this accounting view and abandon diluted EPS in favor of the Economic EPS methodology of the present invention. Economic EPS is a better measure of existing shareholders' probable economics. Specifically, it recognizes that: (1) the interest paid to convertible bond holders reduces income available to existing shareholders; (2) the equity dividend policy affects the division of earnings between existing and future shareholders; and (3) the number of shares (denominator) is uncertain as well as the earnings themselves (numerator).

Figure 1:
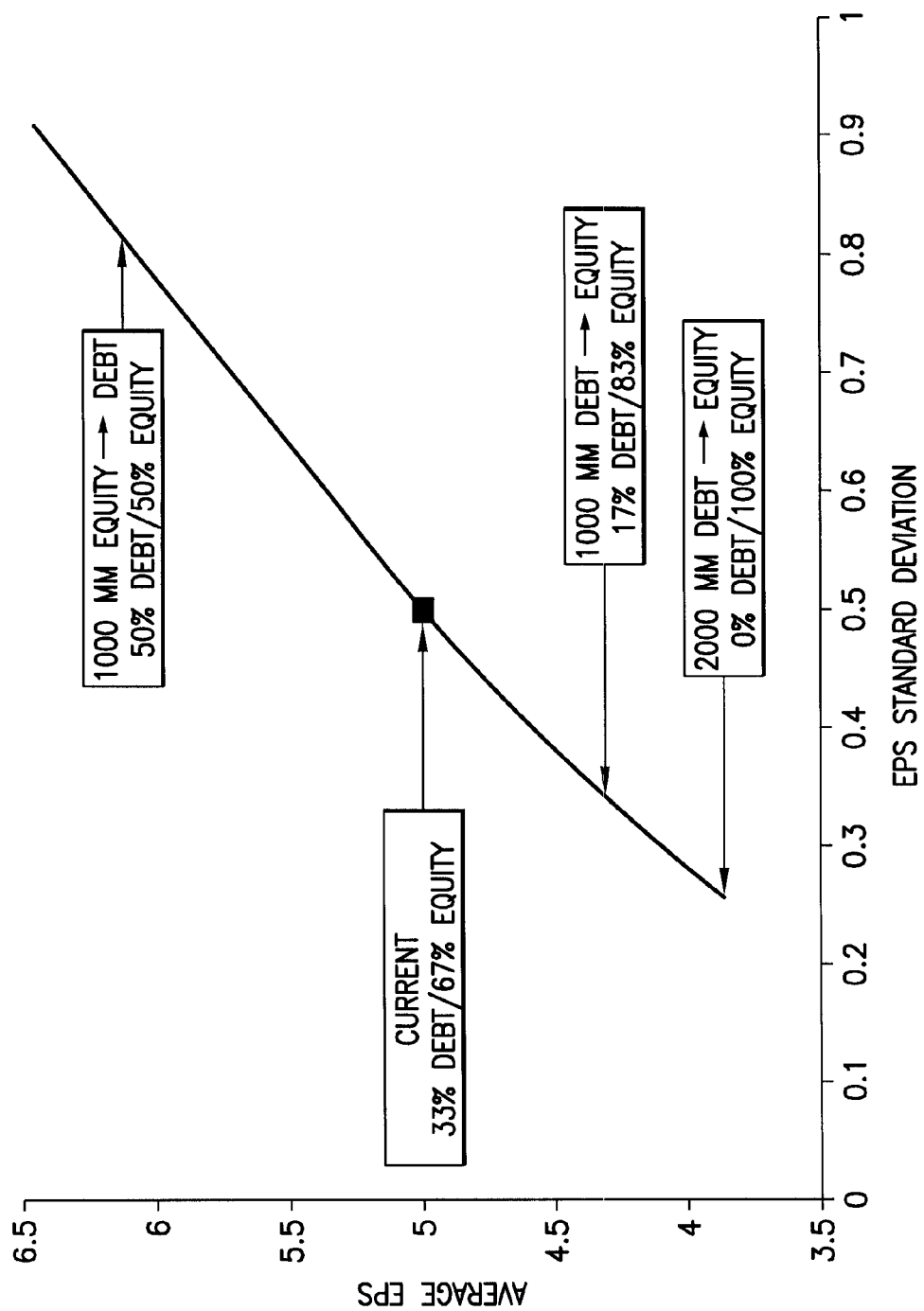
FIG. 1 shows a plot of a capital structure efficient frontier according to an embodiment of the present invention.

Of note, certain figures have legends with identification numerals associated therewith. These identification numerals correspond, of course, to various likewise labeled plot elements included in respective ones of the figures.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment the present invention provides a method implemented by a programmed computer system for characterizing earnings of an entity, which method comprises the steps of: inputting data associated with the entity including a number of common shares outstanding, a value of earnings, a value of dividends per share, a change in the effective number of common shares outstanding, which change in the effective number of common shares outstanding reflects the possibility, based upon an economically reasonable analysis in light of market conditions, of conversion of a convertible security; and a value of coupon payments; calculating at least one value of earnings per share associated with the entity based upon at least some of the input data, wherein each value of earnings per share is calculated at least in part using the formula $$EPS = DPS_0 + \frac{Earnings_0 - N_o \times DPS_0 - Coupon}{N_o + \Delta N_{eff}},$$

wherein $Earnings_0$ equals the input value of earnings, $N_o$ equals the input number of common shares outstanding, $DPS_0$ equals the input value of dividends per share, Coupon equals the input value of coupon payments, and $\Delta N_{eff}$ equals the input change in the effective number of common shares outstanding; calculating values of earnings per share risk associated with the entity based upon at least some of the input data; and recording the calculated earnings per share values associated with the entity and the calculated earnings per share risk values associated with the entity.

In one example, the method may further comprise: iteratively changing a value of a stock price associated with the entity; iteratively changing the value of coupon payments associated with the entity; iteratively calculating additional values of earnings per share using the formula $$EPS = DPS_0 + \frac{Earnings_0 - N_o \times DPS_0 - Coupon}{N_o + \Delta N_{eff}}.$$

In another example, the entity may be a public corporation.

In another example, at least one of the calculated earnings per share values and the calculated earnings per share risk values may be applied to a financial presentation relating to at least one of a balance sheet and an earnings per share metric.

In another example, the iterations and calculations may be carried out at least in part using a Monte Carlo simulation.

In another example, the outputted calculated earnings per share values and the outputted calculated earnings per share risk values may be plotted against one another.

In another example, the plot of calculated earnings per share values versus calculated earnings per share risk values may be credit adjusted.

In another example, the economically reasonable analysis in light of market conditions may take into account a conversion premium associated with the convertible security.

In another embodiment the present invention provides a method implemented by a programmed computer system for characterizing earnings of an entity, which method comprises the steps of: inputting data associated with the entity including a number of existing shares, a value of earnings, a value of an equity dividend, a value of an attributed after-tax interest expense from a convertible security, and a number of attributed shares from the convertible security, which number of attributed shares reflects the possibility, based upon an economically reasonable analysis in light of market conditions, of conversion of the convertible security; calculating at least one value of earnings per share associated with the entity based upon at least some of the input data, wherein each value of earnings per share is calculated at least in part using the formula $EPS$=dividend per share+retained $EPS$;

wherein dividend per share=the value of the equity dividend/the number of existing shares; and wherein retained EPS=(earnings without taking effect of any interest expense from the convertible security minus attributed after-tax interest expense from the convertible security)/(the number of existing shares plus the number of attributed shares from the convertible security); calculating values of earnings per share risk associated with the entity based upon at least some of the input data; and recording the calculated earnings per share values associated with the entity and the calculated earnings per share risk values associated with the entity.

In one example, the method may further comprise: iteratively changing a value of a stock price associated with the entity; iteratively changing the value of coupon payments associated with the entity; iteratively calculating additional values of earnings per share using the formula $EPS$=dividend per share+retained $EPS$;

wherein dividend per share=the value of the equity dividend/the number of existing shares; and wherein retained EPS=(earnings without taking effect of any interest expense from the convertible security minus attributed after-tax interest expense from the convertible security)/(the number of existing shares plus the number of attributed shares from the convertible security).

In another example, the entity may be a public corporation.

In another example, at least one of the calculated earnings per share values and the calculated earnings per share risk values may be applied to a financial presentation relating to at least one of a balance sheet and an earnings per share metric.

In another example, the iterations and calculations may be carried out at least in part using a Monte Carlo simulation.

In another example, the outputted calculated earnings per share values and the outputted calculated earnings per share risk values may be plotted against one another.

In another example, the plot of calculated earnings per share values versus calculated earnings per share risk values may be credit adjusted.

In another example, the economically reasonable analysis in light of market conditions may take into account a conversion premium associated with the convertible security.

In another embodiment the present invention provides a method implemented by a programmed computer system for characterizing a capital structure of an entity in connection with a cost of a selected debt/equity ratio relative to a risk associated with the selected debt/equity ratio, which method comprises the steps of: iteratively changing a value of a debt/equity ratio associated with the entity; calculating values of earnings per share associated with the entity based at least in part upon the iteratively changed values of the debt/equity ratio associated with the entity; calculating values of earnings per share risk associated with the entity based at least in part upon the iteratively changed values of the debt/equity ratio associated with the entity; and recording the calculated earnings per share values associated with the entity and the calculated earnings per share risk values associated with the entity.

In one example, the entity may be a public corporation.

In another example, at least one of the calculated earnings per share values and the calculated earnings per share risk values may be applied to a financial presentation relating to at least one of a balance sheet and an earnings per share metric.

In another example, the iterations and calculations may be carried out at least in part using a Monte Carlo simulation.

In another example, the outputted calculated earnings per share values and the outputted calculated earnings per share risk values may be plotted against one another.

In another example, the plot of calculated earnings per share values versus calculated earnings per share risk values may be credit adjusted.

In another example, the method may further comprise: inputting data associated with the entity including a number of common shares outstanding, a value of earnings, a value of dividends per share, a change in the effective number of common shares outstanding, which change in the effective number of common shares outstanding reflects the possibility, based upon an economically reasonable analysis in light of market conditions, of conversion of a convertible security; and a value of coupon payments; wherein each value of earnings per share is calculated at least in part using the formula $$EPS = DPS_0 + \frac{Earnings_0 - N_o x\ DPS_0 - \text{Coupon}}{N_o + \Delta N_{eff}},$$

wherein $Earnings_0$ equals the input value of earnings, $N_o$ equals the input number of common shares outstanding, $DPS_0$ equals the input value of dividends per share, Coupon equals the input value of coupon payments, and $\Delta N_{eff}$ equals the input change in the effective number of common shares outstanding.

In another example, the economically reasonable analysis in light of market conditions may take into account a conversion premium associated with the convertible security.

In another example, the method may further comprise: inputting data associated with the entity including a number of existing shares, a value of earnings, a value of an equity dividend, a value of an attributed after-tax interest expense from a convertible security, and a number of attributed shares from the convertible security, which number of attributed shares reflects the possibility, based upon an economically reasonable analysis in light of market conditions, of conversion of the convertible security; wherein each value of earnings per share is calculated at least in part using the formula $EPS$=dividend per share+retained $EPS$;

wherein dividend per share=the value of the equity dividend/the number of existing shares; and wherein retained EPS=(earnings without taking effect of any interest expense from the convertible security minus attributed after-tax interest expense from the convertible security)/(the number of existing shares plus the number of attributed shares from the convertible security).

In another example, the economically reasonable analysis in light of market conditions may take into account a conversion premium associated with the convertible security.

The present invention provides an aid in answering the following question. What is the optimal capital structure for a given entity (e.g., a public corporation)? This puzzle of corporate finance has typically remained in the realm of theoretical speculation. Until now, actually applying the theory has typically been hindered by the difficulty of evaluating and comparing the economic cost and risk of debt, equity, and hybrid alternatives along the debt/equity continuum. One embodiment of the present invention is directed to a new quantitative framework for analyzing a company's existing capital structure. Another embodiment of the present invention is directed to suggesting more efficient financing alternative(s). The model utilized in the present invention is practical to implement, yet solidly grounded in modern finance theory (e.g., with wide application of academic concepts: firm value, Modigliani Miller Propositions I and II, tax shields, financial distress, and CAPM. The model is practically implementable, focusing on quantifiable numbers, such as earnings, dividends and dilution). In general, the model is based upon four basic ideas:

1) Earnings per Share and the Capital Structure Efficient Frontier: As utilized by the present invention, earnings per share is a powerful metric that may be used to compare debt and equity on the basis of both cost and risk, resulting in a "Capital Structure Efficient Frontier". Although the Capital Structure Efficient Frontier is neither generic nor static, it generally portrays a trade-off where debt is less costly but more risky than equity.

2) Credit Quality and Future Cost of Capital: Moving toward the equity end of the Capital Structure Efficient Frontier decreases leverage and therefore lowers the future cost of capital. By taking this indirect benefit into account, the methodology of the present invention can more accurately estimate the effective cost of equity and hybrids with high equity credit.

3) Economic Earnings per Share and Hybrids: "Economic EPS" (as opposed to diluted EPS) captures risk in both earnings and number of shares, allowing the broader set of hybrid alternatives, including (but not limited to) convertible securities and stock options, to be evaluated in the same framework. Hybrids can expand the Capital Structure Efficient Frontier by offering a better cost versus risk tradeoff than capital structures consisting of only combinations of debt and equity.

4) Taxes and Hybrids: Interest expense on debt is typically tax-deductible, but dividends on equity and preferred securities are typically not. The tax treatment of hybrids may be critical to their economic performance and for determining whether they fall on the Capital Structure Efficient Frontier. Several innovative hybrid structures available in the marketplace today are highly tax-advantaged (for example, trust preferred and Zero-put Contingent Convertible securities). Various examples (which examples are intended to be illustrative and not restrictive) provided below illustrate how the framework of the present invention may be used to analyze a wide range of capital structure transactions, including (but not limited to) debt-financed share repurchase, equity-financed debt repurchase, mandatory and contingent convertible debt issuance, preferred and trust preferred issuance, and stock option financing.

Referring now to earnings per share and the Capital Structure Efficient Frontier, it is noted that modern finance theory states that the capital structure of a firm should be chosen to maximize the value of the firm's assets. According to theory, a company can evaluate debt, equity and hybrid alternatives by computing how much each alternative increases the value of the firm and then choosing the most value-adding alternative. Unfortunately, applying the theory is neither intuitive nor straightforward. One embodiment of the present invention is directed to a framework based upon earnings per share that is not only more intuitive and more applicable, but also firmly grounded in finance theory.

Basic EPS is defined in SFAS No. 128, paragraphs 8-10 as:

$$EPS = \text{Income available to common stockholders/Number of common shares outstanding}$$

where income available is equal to income from continuing operations minus dividends on preferred stock. It measures how much of each period's income each existing shareholder is entitled to. In the context of EPS, adding debt lowers earnings (the numerator), while adding equity raises the number of shares (the denominator). EPS (the ratio) is lowered in either case, but through very different mechanisms (the money raised by either form of financing would presumably be deployed to increase EPS through investment, liability management, or share repurchase).

As noted above, one embodiment of the present invention is directed to a framework/methodology that can account for the differences in risk between debt and equity (as well as for the differences in cost). The management of a company interested in maximizing shareholder value would do well to focus on optimizing EPS: maximizing its level and minimizing its uncertainty.

Consider now the example (which example is intended to be illustrative and not restrictive) of Company XYZ with the capital structure and earnings profile shown in the "Before" column in Table 1, below.

TABLE 1

Company XYZ Capital Structure and Earnings per Share Before and After $200 Million Debt-Financed Share Repurchase

|  | Before | After | Change |
| --- | --- | --- | --- |
| Capital Structure |  |  |  |
| Number of Shares | 100 MM | 95 MM | (5 MM) |
| Share Price | $40 | $40 | — |
| Equity | $4000 MM | $3800 MM | ($200 MM) |
| Debt | $2000 MM | $2200 MM | $200 MM |
| Debt/Total Cap. | 33% | 37% | 4% |
| Year 1 Earnings |  |  |  |
| Earnings | $500 MM | $492 MM | ($8 MM) |
| Earnings Risk | $50 MM | $52 MM | $2 MM |
| EPS | $5.00 | $5.18 | $0.18 |
| EPS Risk | $0.50 | $0.55 | $0.05 |
| P/E Ratio | 8.0 | 7.7 | (0.3) |

Company XYZ is considering issuing debt to repurchase $200 mm of equity and would like to quantify the cost versus risk trade-off of this change in capital structure. The actual impact of this transaction on Company XYZ's capital structure and earnings per share are calculated and shown in the "After" and "Change" columns of Table 1. The added after-tax interest expense associated with $200 mm of additional debt depresses earnings and increases its volatility. Using the proceeds to buy back 5 mm common shares at $40 per share reduces the number of common shares outstanding from 100 mm to 95 mm. This antidilution is enough to offset the increase in interest expense and raise the expected EPS by 3.5%, from $5.00 per share to $5.18. Replacing equity with debt is cheaper, but it is also riskier. This is because a larger amount of earnings volatility is shared by a smaller number of shareholders. EPS risk rises by 10%, from $0.50 per share to $0.55.

Referring now to FIG. 1, this Figure depicts a graphical representation of the cost versus risk tradeoff of this $200 mm transaction in a more global context. Increasing the amount of the transaction traces out a Capital Structure Efficient Frontier representing the lower cost but higher risk associated with an increasingly levered capital structure. Issuing shares and repurchasing debt moves in the opposite direction along the Capital Structure Efficient Frontier, corresponding to more costly, yet less risky, unlevered capital structures.

Although it was the case for Company XYZ, equity will not necessarily always be more costly than debt. For example (which example is intended to be illustrative and not restrictive), again assuming the same facts as used for Company XYZ above, Table 2, below, shows the sensitivity of the EPS economics of the share repurchase transaction to the share price.

TABLE 2

Sensitivity of EPS Impact of Share Repurchase to Share Price

| | Share Price | | |
|---|---|---|---|
| | $40 | $100 | $200 |
| Shares | | | |
| Existing | 100 MM | 100 MM | 100 MM |
| Repurchased | 5 MM | 2 MM | 1 MM |
| Remaining | 95 MM | 98 MM | 99 MM |
| Year 1 EPS | | | |
| EPS | $5.18 | $5.02 | $4.97 |
| EPS Risk | $0.55 | $0.53 | $0.53 |
| P/E Ratio | 7.7 | 19.9 | 40.2 |

For growth companies with very high P/E ratios it is inefficient to replace equity with debt. A company with a P/E ratio of 40 would actually reduce EPS rather than increase it by repurchasing shares at an elevated price of $200 per share. This conclusion is consistent with a traditionally accepted doctrine: Companies that are still in the high growth phase of development should maintain a more equity-intensive capital structure, while more-established companies can afford to have higher levels of debt. Likewise, debt may not always be more risky than equity. If a company's earnings are positively correlated with interest rates, as is the case for many financial companies, replacing equity with debt would potentially reduce both cost and risk. In line with intuition, financial companies would be expected to favor highly levered capital structures.

Thus, the optimal capital structure is neither generic nor static. Rather, it depends upon the characteristics of the specific company and its industry, as well as changing market conditions.

Referring now to credit quality and future cost of capital, it is believed that while growth companies with 100% equity capital structures do in fact exist, there are essentially no financial companies with 100% debt capital structures. There are a number of reasons for this. For one thing, industry specific regulations, such as the Basel Accord minimum capital ratios for banks, may put absolute constraints on a company's leverage. Another softer constraint that actually affects essentially all companies is the impact of leverage on a company's credit ratings and therefore its future cost of capital. The more leveraged a firm, the greater its risk of default. Future bondholders and shareholders will demand a higher risk premium before investing to compensate for this higher risk. This raises the company's future cost of capital. As the company refinances maturing debt and the debt portfolio is repriced at higher and more volatile spreads, interest expense and risk both rise, resulting in a decrease in EPS and an increase in its volatility.

Referring now to the question of how much are credit spreads affected by changes in a company's leverage, this question is broken into two parts:
1) How much do credit ratings change with changes in leverage and coverage ratios?
2) How much do credit spreads change with changes in credit ratings?

In Table 3, below, the relationship among financial ratios, ratings and credit spreads is estimated for this example.

TABLE 3

Relating Leverage to Credit Spreads

| | S&P(1) | | Credit Spreads(2) | |
|---|---|---|---|---|
| | Debt/Cap. | EBIT/Int. | Mean | Std. Dev. |
| AAA | 20% | 21.4 | 97 | 16 |
| AA | 25% | 10.1 | 120 | 19 |
| A | 40% | 6.1 | 156 | 28 |
| BBB | 50% | 3.7 | 211 | 32 |
| BB | 60% | 2.1 | NA | NA |

Notes on Table 3: (1) From S&P's 2002 Corporate Ratings Criteria. Debt/Capitalization based upon ratio guidelines for "above average" US industrials. EBIT/Interest based upon three year medians for US industrials; (2) From the Goldman Sachs USD Investment Grade Index for the past three years.

Figure 2:
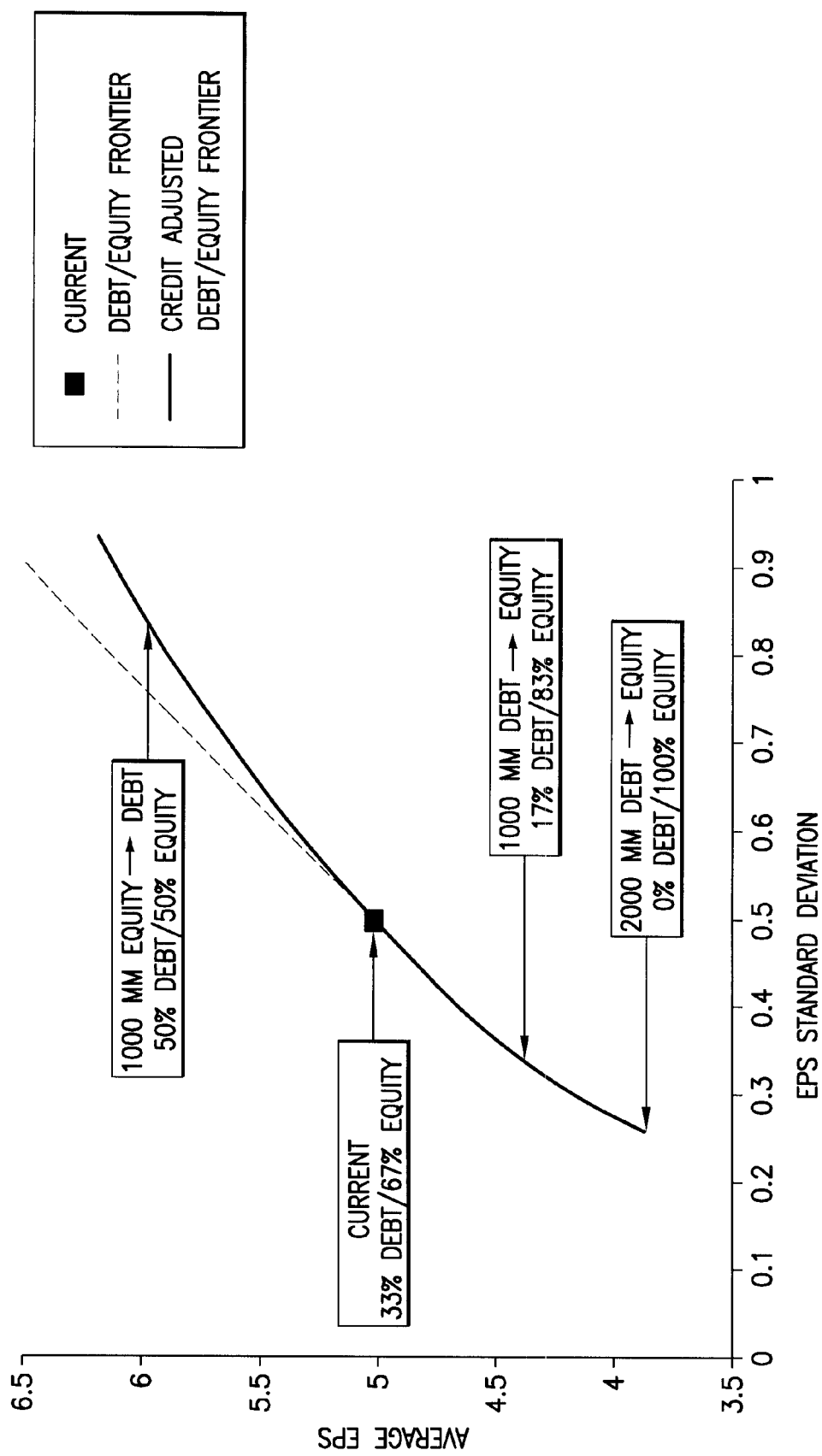
FIG. 2 shows a plot of a credit-adjusted capital structure efficient frontier according to an embodiment of the present invention.

These estimates can be used to adjust Company XYZ's Capital Structure Efficient Frontier for changes in credit quality. FIG. 2 shows both the unadjusted and the credit-adjusted Capital Structure Efficient Frontiers. As seen in this FIG. 2, adjusting for credit flattens the Capital Structure Efficient Frontier by narrowing the difference in effective cost between debt and equity and widening the difference in effective risk. The Capital Structure Efficient Frontier flattens more at higher leverage levels, so that increasing leverage tends to further produce diminishing returns—a smaller marginal gain in EPS and a larger marginal gain in risk. In part, this can explain a company's reluctance to maximize its leverage.

Referring now to equity hybrids, it is noted that these are neither debt nor equity, so they do not fit easily into typical financial ratio calculations. Recognizing this, both S&P and Moody's have provided guidance regarding their methodology for evaluating the impact of hybrids on leverage ratios. These methods include: (1) assigning hybrids 100% equity credit but limiting hybrids to a fraction of the total equity (S&P); (2) assigning hybrids fractional equity credit depending upon where they are deemed to fall on the debt/equity continuum (Moody's); and (3) calculating and considering several alternative sets of ratios.

It is believed that subordinated and secured debt should also be viewed in this context. While subordinated debt is more expensive than senior debt for the issuer owing to its lower claim on assets, it makes more assets available to future bondholders, thereby making future borrowing less costly. Similarly, secured debt is cheaper than ordinary senior debt, but it reduces the amount of assets available to future bondholders and shareholders, making the future cost of capital higher.

Still referring to hybrids, it is noted, as discussed above, that hybrids also pose a challenge for evaluating EPS.

The flaws discussed above make diluted EPS a poor tool for making economically based decisions regarding hybrid securities. In order to capture the economic consequences of hybrids more accurately, it is necessary to depart from the traditional accounting view and abandon diluted EPS in favor of the Economic EPS methodology of the present invention.

Economic EPS is a better measure of existing shareholders' probable economics. Specifically, it recognizes that (1) the interest paid to convertible bond holders reduces income available to existing shareholders; (2) the equity dividend policy affects the division of earnings between existing and future shareholders; and (3) the number of shares (denominator) is uncertain as well as the earnings themselves (numerator). Economic EPS can be calculated as the sum of two pieces:

Economic $EPS$=Dividend per share+Retained $EPS$

1) Each existing shareholder is entitled to a share of the current dividend (income). Of note, convertible shareholders may, in some cases, be entitled to dividends on the underlying shares. In those cases, no separation is necessary and all income, whether dividend or retained, is shared between current and future shareholders.

Dividend per share=Equity dividend/Number of existing shares

2) Each existing shareholder must share the rest of the earnings with other existing shareholders and potential future shareholders (capital gain).

Retained $EPS$=Remaining income/Number of existing and future shares

The number of new shares can be estimated based upon all available information at the time, for example, how far the conversion option is in or out of the money. Rather than a single fixed number, the estimate may include an estimate of uncertainty, e.g., 5.0 mm expected shares with a standard deviation of 1.2 mm shares. Of note, these estimates may be made by simulating the market as well as the issuer's and investors' actions on a scenario-by-scenario basis to determine the actual number of future shares created under the scenario; the results from each scenario may then be collected to form a probability distribution of outcomes.

To illustrate this methodology, consider again Company XYZ. In this example Company XYZ is thinking about raising $400 mm of additional capital through issuance of either: 1) 10 mm shares of equity; or 2) $400 mm of a convertible bond that pays a 4% coupon after taxes for three years, then mandatorily converts into between 8.3 mm and 10 mm shares, depending upon the share price (This is similar to Goldman Sachs' ACES structure. For example, when the share price is below its current value of $40, the bond converts to 10 MM shares. If it is 20% or above (i.e., $48), it converts to 8.3 MM shares. In between, it converts to $400 MM/price shares).

Company XYZ pays a $1 dividend to any shareholder, but pays no dividend to convertible bond holders until they convert. Assuming earnings in the upcoming year are unchanged, Table 4, below, illustrates the dilution of Economic EPS for the two issuance alternatives.

TABLE 4

Dilution of Year 1 Economic EPS Under Alternative Issuance Scenarios

|  | Current | Issue Equity | Issue Convert |
|---|---|---|---|
| Year 1 Earnings | | | |
| Earnings | $500 MM | $500 MM | $484 MM |
| Dividend | $100 MM | $110 MM | $100 MM |
| Retained | $400 MM | $390 MM | $384 MM |

TABLE 4-continued

Dilution of Year 1 Economic EPS Under Alternative Issuance Scenarios

|  | Current | Issue Equity | Issue Convert |
|---|---|---|---|
| Shares | | | |
| Existing Shares | 100 MM | 110 MM | 100 MM |
| Future Shares | 0 MM | 0 MM | 9 MM |
| Uncertainty | 0 MM | 0 MM | 1 MM |
| Year 1 EPS | | | |
| Dividends Per Share | $1.00 | $1.00 | $1.00 |
| Retained EPS | $4.00 | $3.55 | $3.53 |
| EPS | $5.00 | $4.55 | $4.53 |
| EPS Risk | $0.00 | $0.00 | $0.03 |

In the case of equity issuance, Economic EPS in this example is simply diluted by the addition of 10 MM shares, resulting in a year 1 EPS of $4.55. It is not affected by the dividend policy at all. For the convert, overall earnings available to existing shareholders are reduced by the interest expense of $16 mm. Existing shareholders still receive a $1 per share dividend, but the retained earnings must be shared with 9 mm (plus or minus 1 mm) future shareholders, resulting in retained EPS of $3.53. Overall the convertible dilutes year 1 EPS to $4.53. Based upon this analysis, the convertible would appear to be less attractive than pure equity issuance. However, it would be shortsighted to focus only on year 1 Economic EPS. After the conversion, there may be fewer shares outstanding with the convertible than with the equity issuance. In fact, issuing the convertible rather than equity may result in smaller dilution of future earnings.

Referring now to stock options, it is noted that these can also be considered a hybrid form of financing. The issuer receives the option premium in exchange for later repayment of the option payoff (in the form of cash or stock). One way to think about employee stock options is as two transactions: (1) The company pays the employee in cash; (2) The company finances that expense by selling an equivalent value of stock options to the same employee (This perspective is consistent with the current movement pursued by legislators and regulators, and adopted by more and more forward-looking corporations, to expense stock options. Separating the transaction into two makes it clear that the expense occurs in the first (operating) transaction, and not in the second (financing) transaction. It is also clear that the transaction involves two types of cash flows: operating cash flow in the first transaction and financing cash flow in the second transaction. This cash flow distinction is especially poignant in light of recent corporate accounting irregularities). Stock options can be analyzed similarly in the Economic EPS framework. Existing shareholders need not share dividends with option holders, but any retained earnings would be shared with an uncertain number of future shareholders. The expected number of potential future shareholders, and its uncertainty, can be estimated based upon all available information at the time.

As an example, again consider Company XYZ, but assume that there are 5 mm exercisable call options outstanding with a strike price of $40 and which expire in five years. In Table 5, below, several share price scenarios are considered, and both the expected number of shares to be issued in the future to pay off option holders and the uncertainty in that number is determined.

TABLE 5

Sensitivity of Stock Option Dilution to Share Price

| | Share Price Scenario | | |
|---|---|---|---|
| | $40 | $70 | $100 |
| Shares | | | |
| Existing Shares | 100 MM | 100 MM | 100 MM |
| Future Shares | 1.5 MM | 3.5 MM | 4.5 MM |
| Uncertainty | 1.0 MM | 1.3 MM | 0.5 MM |
| Year 1 EPS | | | |
| BPS | $4.93 | $4.83 | $4.78 |
| EPS Risk | $0.05 | $0.06 | $0.02 |

When the share price is at the money ($40 per share), diluted EPS calculated using the treasury stock method would register no change, because it is based upon the intrinsic value of the option. Economic EPS, on the other hand, recognizes that there is an appreciable probability that these options will in fact be exercised in the future, and that each option would convert to about 1.5 shares with an uncertainty of 1.0 share. For options that are well in the money, there is a higher likelihood of exercise and less uncertainty regarding the outcome. The Economic EPS method is actually similar in this example to the diluted EPS method. Instead of fixing the number of shares by assuming exercise today, however, Economic EPS estimates the number of shares and its uncertainty by assuming exercise in the future.

Referring now to taxes and hybrids, it is noted that taxes are a fundamental and essential element of the capital structure decision (In fact, Modigliani and Miller's famous Proposition I concludes that a firm's capital structure is irrelevant in the absence of taxes and costs of financial distress. See F. Modigliani and M. H. Miller, "The Cost of Capital, Corporation Finance and the Theory of Investment", American Economic Review, 48:261-297 (June 1958), or R. A. Brealey and S. C. Myers, Principles of Corporate Finance, 5th Edition, McGraw-Hill, New York, 1996).

The tax treatment of debt and equity is straightforward: Interest expense on debt is typically tax-deductible while dividends on equity typically are not. The tax treatment of equity hybrids must clearly lie somewhere between debt and equity. An important question is, where?

Preferred securities fall essentially in the middle of the debt/equity continuum since they have properties that are intermediate between debt and equity: (1) maturities that are typically long or perpetual, (2) fixed dividend payments that are deferrable without triggering default, (3) investor claim on assets that is between debt and equity, and (4) partial ratings and regulatory equity credit. The tax treatment on preferred securities, however, is essentially identical to equity: Dividends are not tax-deductible. For this reason, plain-vanilla preferred securities have largely been replaced by trust preferred securities (e.g., MIPS, QUIPS, and Capital Securities), which have all the above desired equity properties of plain-vanilla preferred securities but also have what are effectively tax-deductible dividends. This is accomplished by issuing the preferred securities through a wholly owned trust, which then loans the proceeds to the parent. The interest payments on the loan are exactly matched to the dividend payments on the preferred security. However, the interest paid by the parent is tax-deductible and is not offset by tax paid on interest received by the trust. On consolidation, the net effect is a tax-deductible preferred security. This tax deduction allows trust preferreds to jockey for a better position on the Capital Structure Efficient Frontier than that of plain-vanilla preferreds (see FIG. 3).

Convertible bonds offer a different challenge since they change character from debt to equity over time. Until they are converted, convertible bonds generate tax-deductible interest expense. Generally, however, because of the conversion option, the coupon on convertible bonds is lower than the coupon on comparable non-convertible bonds, so the tax deduction is correspondingly smaller. For this reason, ordinary convertibles, including mandatory convertibles such as ACES, may take their place on the Capital Structure Efficient Frontier, but are not been expected to expand the frontier (see FIG. 3).

A recent ruling by the IRS changes the landscape for convertibles, creating an opportunity to significantly enhance the interest tax deductions on variants of convertibles known as contingent convertibles (see Revenue Ruling 2002-31; see also § 1.1275-4 of the Income Tax Regulations on contingent payment debt instruments). Contingent convertibles differ from ordinary convertibles by the addition of one or more features that make the periodic payments dependent (or contingent) upon another factor. For example, coupon payments on the convertible bond may be structured to include the dividend on the underlying shares. If the contingencies are neither remote nor incidental, then the issuer may take interest tax deductions based upon interest accrued at a much higher straight debt rate. The appropriate rate would correspond to the yield on non-convertible debt with essentially the same terms (maturity, payment dates, seniority) as the convertible bond. The enhanced tax deductibility of contingent convertible debt has the potential to expand the Capital Structure Efficient Frontier significantly (see FIG. 3).

In practice, structuring contingent convertibles requires a delicate balance of many considerations: satisfying conditions required for contingent payment debt treatment, maximizing tax deductions, minimizing accounting interest expense, avoiding if-converted EPS accounting, and creating investor demand. Examples of such securities developed at Goldman Sachs include Contingent Accretion Rate Securities (CARZ) and Zero-put Contingent Convertible Securities (CUBZ, TUBZ, and PLANZ).

In addition, it is noted that there may be tax advantages associated with adding employee stock options to a company's capital structure.

Taxes are fundamental to the determination of optimal capital structure. While many of the complexities arise from the tax treatment of hybrid securities, certain additional tax effects should be considered under all circumstances. Although companies are generally free to choose their capital structure, the IRS may treat debt as stock for tax purposes if it deems the debt/equity ratio to be unreasonably high. This would result in a loss of the interest tax deduction. Another deterrent to overly leveraged capital structures is the potential for interest expense to be so high that it generates a net operating loss. In this case, the value of the tax deduction would be reduced, since a portion may have to be deferred (carried forward), if possible, or otherwise forfeited.

Figure 3:
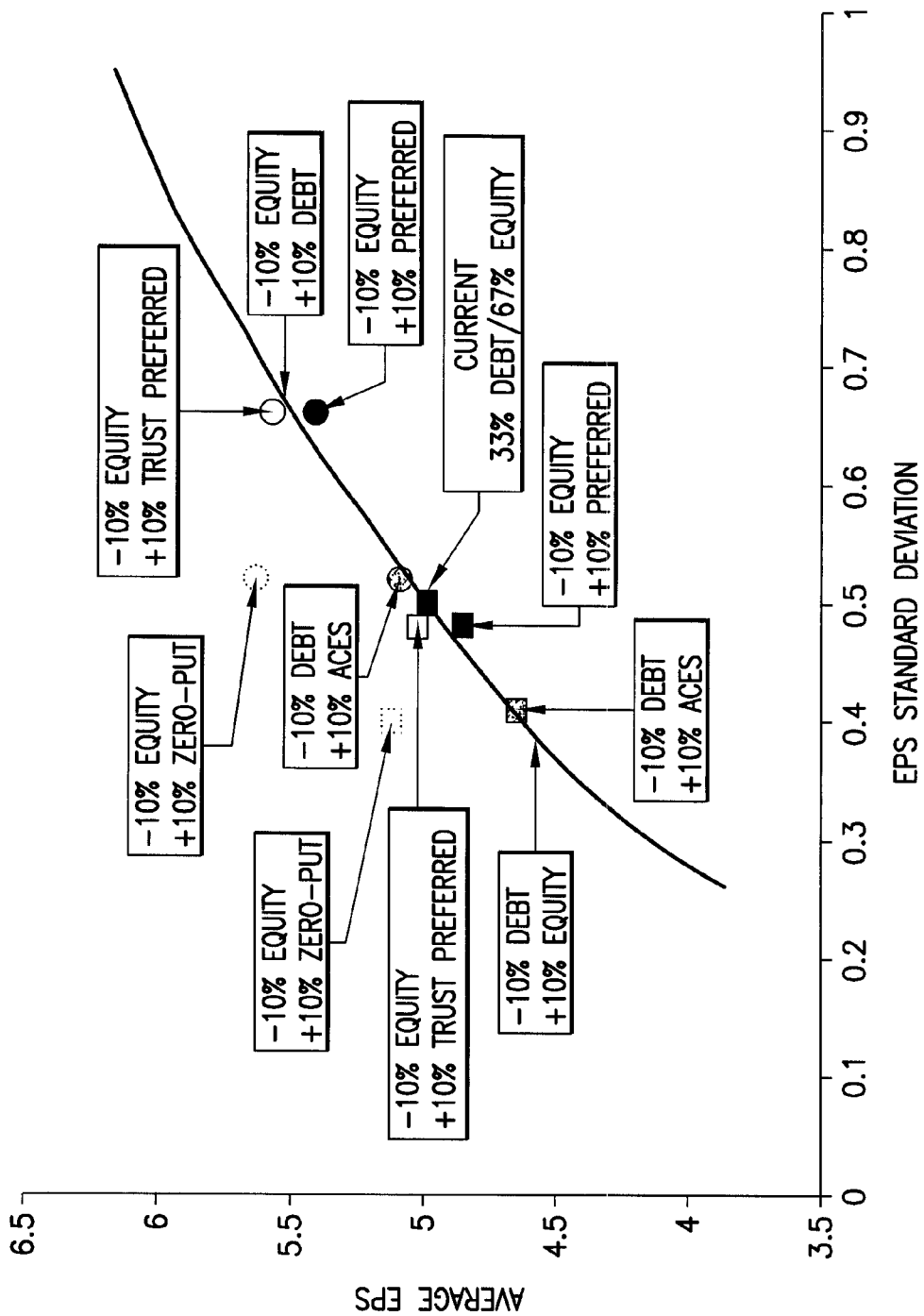
FIG. 3 shows a plot of capital structure efficient frontier with hybrids (relating to share repurchase and debt replacement) according to an embodiment of the present invention.

Referring now to restructuring, as an application of the framework/methodology of the present invention discussed above, strategies for realigning Company XYZ's capital structure will now be considered. FIG. 3 shows the impact of modifying 10% of Company XYZ's capital structure by issuing debt, equity, or hybrids and using the proceeds to repurchase equity or pay down debt. For comparison, the debt/equity Capital Structure Efficient Frontier is also indicated. Moving toward the debt end of the spectrum by replacing equity with other alternatives generally increases Expected EPS as well as EPS volatility; meanwhile, replacing debt generally decreases both Expected EPS and its volatility. Most of the hybrid strategies fall near the debt/equity Capital Structure Efficient Frontier, although trust preferred securities have slightly higher Expected EPS because of their favorable tax treatment. Zero-put Contingent Convertibles are an exception. Replacing equity with these structures boosts Expected EPS by more than 10% while only marginally increasing volatility. Replacing debt with Zero-put securities reduces risk by 20% and increases Expected EPS slightly. Zero-put Contingent Convertibles greatly expand the Capital Structure Efficient Frontier. The overwhelming tax benefits of contingent convertibles are clearly illuminated by this framework.

These results are summarized in Table 6, below, where the Economic EPS shortfall risk is also calculated.

TABLE 6

Comparison of Restructuring Alternatives

| Strategy | Economic EPS Statistics | | |
|---|---|---|---|
| | Average | STD | Shortfall Risk |
| Current | $5.00 | $0.50 | $0.40 |
| Debt Replacement | | | |
| −10% Debt/+10% Equity | 4.58 | 0.39 | 1.15 |
| −10% Debt/+10% Preferred | 4.87 | 0.48 | 0.55 |
| −10% Debt/+10% Trust Preferred | 5.03 | 0.48 | 0.37 |
| −10% Debt/+10% ACES | 4.66 | 0.41 | 0.94 |
| −10% Debt/+10% Zero-put Contingent | 5.13 | 0.40 | 0.26 |
| Share Repurchase | | | |
| −10% Equity/+10% Debt | 5.53 | 0.67 | 0.12 |
| −10% Equity/+10% Preferred | 5.42 | 0.66 | 0.16 |
| −10% Equity/+10% Trust Preferred | 5.58 | 0.66 | 0.10 |
| −10% Equity/+10% ACES | 5.10 | 0.50 | 0.31 |
| −10% Equity/+10% Zero-put Contingent | 5.60 | 0.52 | 0.06 |

Shortfall risk is a one-sided risk measure that quantifies the risk of performing worse than some benchmark, in this case, the current capital structure (Shortfall risk is technically defined here as the probability of falling short of the benchmark multiplied by the average shortfall). On a shortfall basis, moving toward the debt end of the spectrum appears more appropriate for Company XYZ, since shifting out of equity and into other alternatives both increases Expected EPS and decreases its shortfall risk. Still, shifting out of debt may be appropriate if it is replaced, for example, with trust preferreds or Zero-put Contingent Convertible securities.

Of note, decisions regarding a company's capital structure should generally be based upon a detailed analysis of the economic cost versus risk trade-off of financing alternatives. Nevertheless, other considerations may place constraints on the capital structure alternatives that a company is able to or is willing to consider. For example:

Regulations: For many financial entities, federal and industry regulations may limit leverage through minimum capital ratios, and deter excessive use of hybrids by limiting equity credit associated with the instruments.

Accounting: Many companies may be sensitive to reported EPS in addition to Economic EPS. This can lead companies to make capital structure decisions that are not necessarily optimal economically, but that do balance economic and accounting considerations.

Referring now to an additional discussion of Economic EPS under an embodiment of the present invention, it is noted, as discussed above, that Economic EPS measures value for existing common shareholders. More particularly, existing common shareholders are entitled to any common dividend that is paid. Shareholders are also entitled to a share of the earnings retained in the business (capital gains). However, these capital gains will also be shared with future shareholders (e.g. convertible bond holders, equity option holders). Thus:

$$\text{Economic } EPS = \text{Common Dividend Per Share} + \frac{\text{Retained Earnings}}{\text{Expected Number of Shares}}$$

$$\text{or Income} + \text{Capital Gains}$$

For a base capital structure consisting of debt and equity only, this would amount to $$EPS_0 = DPS_0 + \frac{Earnings_0 - N_0 \times DPS_0}{N_0} = \frac{Earnings_0}{N_0}$$

where $N_0$ is the existing number of shares, $EPS_0$, $DPS_0$, $Earnings_0$ are the base case earnings per share, dividends per share and earnings, respectively. As expected, dividend policy does not affect shareholder's value.

Accordingly, the Economic EPS framework/methodology of the present invention can help with capital structure decisions such as (but not limited to):

Evaluating the economics of alternative financing instruments including debt, equity, and equity hybrids.

Evaluating capital restructuring ideas, such as debt, equity and hybrid repurchase or retirement.

Of note, Economic EPS≠accounting EPS. More particularly, accounting EPS (diluted EPS) does not accurately capture the economic consequences of equity hybrids such as convertibles (e.g. dilution does not depend upon likelihood of conversion). Economic EPS recognizes that both earnings and expected number of shares are uncertain. Economic EPS also recognizes the impact of dividend policy.

Of further note, Economic EPS unifies debt, equity and hybrids. More particularly, issuing each reduces capital gains by either lowering retained earnings, raising expected number of shares, or both:

Debt: Reduces retained earnings through interest payments (Dividend policy does not matter)

$$EPS = DPS_0 + \frac{Earnings_0 - \text{Interest} - N_0 \times DPS_0}{N_0}$$

$$= \frac{Earnings_0 - \text{Interest}}{N_0}$$

Equity: Increases number of shares (Dividend policy does not matter).

$$EPS = DPS_0 + \frac{Earnings_0 - N_0 \times DPS_0 - \Delta N \times DPS_0}{N_0 + \Delta N}$$

$$= \frac{Earnings_0}{N_0 + \Delta N}$$

Convertibles: Reduces retained earnings through interest and dividend payments. Increases expected number of shares (e.g., depending upon conversion premium and estimated likelihood of conversion).

$$EPS = DPS_0 + \frac{Earnings_0 - N_0 \times DPS_0 - Coupon}{N_0 + \Delta N_{eff}}$$

where $\Delta N_{eff}$ is the effective number of shares, which reflects the possibility that a convertible may convert into the underlying shares $\Delta N_{und}$ or no shares at all. In certain cases, EPS for convertibles can be simplified. If for example, conversion is a certainty ($\Delta N_{eff} = \Delta N_{und}$), and the coupon on the structure is equal to a non-contingent coupon plus dividends on the underlying shares (Coupon=Non-contingent coupon+$DPS_0 \times \Delta N_{und}$) this simplifies to:

$$EPS = \frac{Earnings_0 - \text{Non-Contingent Coupon}}{N_0 + \Delta N_{und}}$$

The following discussion will now characterize the Economic EPS framework/methodology of the present invention in the context of modern finance theory.

Value of the Firm Framework

Modern finance theory states that the capital structure of a firm should be chosen to maximize the value of the firm's assets. On the other hand, Modigliani and Miller's famous Proposition I makes the following assertion:

MM I: In the absence of taxes and financial distress, firm value is independent of capital structure.

The MM I argument is simply that the total value of the firm cannot be changed by slicing up its ownership between different stakeholders. In the real world, adding debt introduces two new third parties: (1) the government, which contributes value to the firm equal to the tax shield on interest payments, and (2) lawyers, who take away value from the firm equal to the potential costs of financial distress. For this reason, changing the capital structure can change the overall value of the firm for stakeholders. The traditional trade-off theory asserts that a firm can maximize its value by increasing its leverage until the incremental value of the tax shield is offset, at the margin, by the incremental cost of financial distress (or, a firm should increase leverage until the increase in EPS due to the tax shield is offset by the increase in EPS risk due to risk of financial distress). But, even after choosing the optimal capital structure possible with existing financing alternatives, firm's needn't be satisfied. The challenge of financial innovation is to design value-adding hybrid financing products that raise the Capital Structure Efficient Frontier by providing a better trade-off between tax shield benefits and costs of financial distress than that offered by debt and equity alone.

Figure 4B:
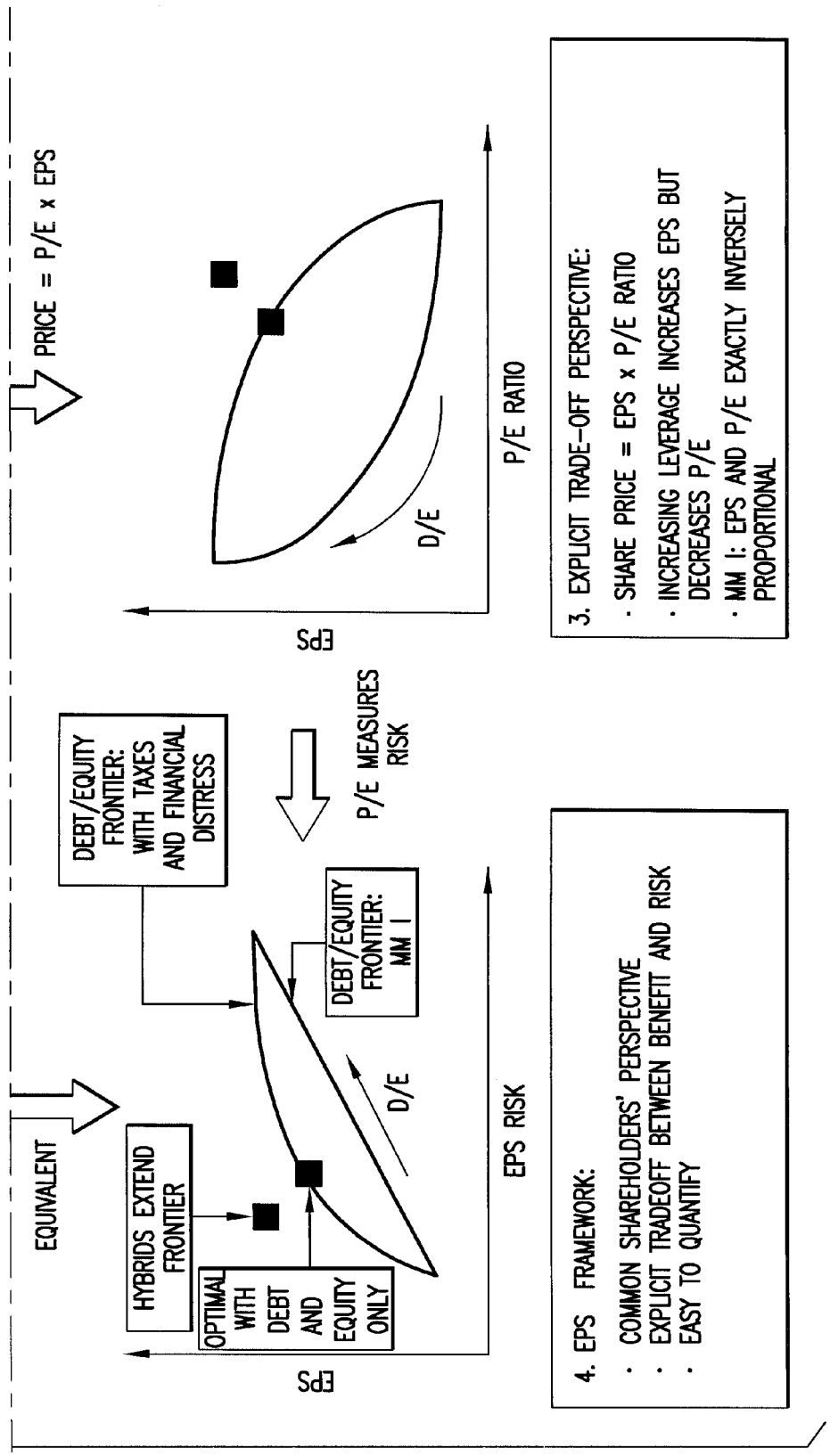
FIG. 4 shows plots of capital structure theory and earnings per share according to an embodiment of the present invention.

While theoretically elegant, the value of the firm framework for optimizing capital structure is difficult to use as an analysis and decision-making tool. In contrast, the Economic EPS framework/methodology provides the ability to discriminate between capital structure alternatives based upon easily quantifiable criteria. The discussion which follows demonstrates that the Economic EPS framework is both solidly grounded in modern finance theory and theoretically equivalent to the value of the firm framework (see FIG. 4 for a road map of this discussion).

Moving to the Shareholders' Perspective

The value of the firm framework challenges the management of a firm to maximize the total value of the firm, yet in practice, management acts to maximize only the value of common shareholders' stake and not the value of other stakeholders such as creditors, debt holders, and convertible holders. As seen below, the total value of the firm is:

Value of the Firm=Common Shareholders' Value+ Other Stakeholders' Value

Common Shareholders' Value=Number of Common Shares×Share Value

Other Stakeholders' Value=Value of obligations to creditors and bond, preferred and convertible holders.

The first step in moving toward a practical framework is to adopt the shareholders' perspective by restating the objective: Capital structure should be chosen to maximize the share value. MM I can be restated from the shareholders' perspective as: In the absence of taxes and financial distress, share value is independent of capital structure as long as transactions are executed at fair market value. In the real world, markets will determine how much of the value of tax shields and the costs of financial distress are distributed between common shareholders and other stakeholders. Mispricing of instruments may also redistribute value between stakeholders.

Moving to an Explicit Tradeoff Perspective

The value of the firm framework implicitly involves a complex cost/benefit/risk tradeoff between the benefits of the tax shield, and the costs and risks of financial distress. In practice, few companies will have developed enough intuition regarding these abstract quantities. The shareholders' perspective is more intuitive. The value of the share can be written as a product of EPS and the P/E ratio:

Price=P/E×EPS

Maximizing share value involves an implicit tradeoff between P/E and EPS. Generally, trying to increase one decreases the other. The next step in moving toward a practical framework is to recast the objective in terms of an explicit tradeoff: Capital structure should be chosen to optimize the tradeoff between EPS and P/E. MM I can be restated from the explicit tradeoff perspective as: In the absence of taxes and financial distress, although both EPS and the P/E ratio depend upon leverage, the changes are exactly inversely proportional so that share price is unchanged (or, in absence of taxes and financial distress, Modigliani and Miller conclude that EPS is linearly related to EPS risk). In the real world, if shareholders receive some value from tax shields, are not charged too much by creditors for the cost of financial distress, or benefit from market mispricing, then EPS can be raised with a smaller decrease in P/E than that predicted by MM I.

Moving to the EPS Framework

While P/E is an intuitive measure, it is not easy to see how to calculate how it changes when the capital structure is changed. Intuitively, certain companies have high P/E ratios because their earnings are less risky than those of companies with low P/E ratios. There exists the following relationship:

$$EPS\ Risk = \frac{a}{P/E} - b$$

where a and b are constants. Maximizing share value involves a tradeoff between EPS and EPS risk. Generally, trying to increase EPS also increases EPS risk. The final step arrives at the Economic EPS Framework: Capital structure should be chosen to optimize the tradeoff between EPS and EPS risk. MM I can be restated in this framework as: In the absence of taxes and financial distress, although both EPS and EPS risk depend upon leverage, the changes are linearly related in such a way that share price is unchanged. (This is, in fact, a paraphrase of MM's Proposition II). In the real world, if shareholders receive some value from tax shields, are not charged too much by creditors for the cost of financial distress, or benefit from market mispricing, then EPS can be raised with a smaller decrease in P/E than predicted by MM I.

Of note, the above formula for EPS risk is derived from these four relationships:

1) Perpetuity: The P/E ratio of a perpetually growing company is inversely proportional to its return on equity, $R_E$.

$P/E = 1/R_E$

2) CAPM: Return on equity is equal to the risk free rate, $R_F$, plus beta times the market risk premium.

$R_E = R_F + \beta \times \text{Market Risk Premium}$

3) Beta: Equity beta is proportional to the equity return risk, $\sigma_E$.

$\beta = \text{Constant} \times \sigma_E$

4) EPS Risk: EPS risk is proportional to equity return risk $\text{EPS Risk} = \text{Constant} \times \sigma_E$ In another embodiment of the present invention simulation analysis is utilized. That is, in order to accurately measure risk, the Economic EPS impact of capital structure decisions may be calculated using Monte Carlo simulation. Of note, this simulation methodology is ideally suited for handling complexities of, for example, Zero-put contingent convertible securities: fluctuating dividends, path dependent tax basis, share price dependent tax recapture, and uncertain call/convert/mature outcome. In any case, in one example (which example is intended to be illustrative and not restrictive), Economic EPS may be calculated using Monte Carlo simulation as follows:

Generate Scenarios Generate numerous (e.g., thousands) of realistic scenarios for future interest rates and stock prices based upon current market conditions and historical experience.

Simulate Company Simulate behavior of the company's earnings and behavior of each financing alternative over the market scenarios, including (but not limited to) coupon, dividend, tax, and principal cash flows; as well as shares outstanding. As mentioned above, this methodology is ideally suited for handling complexities of, for example, Zero-put contingent convertible securities: fluctuating dividends, path dependent tax basis, share price dependent tax recapture, and uncertain call/convert/mature outcome.

Analyze Alternatives Analyze and compare financing alternatives based upon stand-alone after-tax cash flow characteristics. Analyze and compare how alternative restructuring strategies change the company's EPS and EPS risk.

Analyze Strategies Perform optimization analysis to determine the strategies that maximize EPS while minimizing EPS risk. Determine the Capital Structure Efficient Frontier of restructuring strategies.

Test Conclusions Rigorously test conclusions and recommended strategies under adverse and contrarian scenarios. Discard strategies that perform poorly under sensitivity scenarios.

Reference will now be made to a detailed example share repurchase analysis (of course, this example is intended to be illustrative and not restrictive). More particularly, we analyze a $1 BN share repurchase transaction, financed with two competing products: Call-monetized trust preferred securities (e.g. QUIPS) and CUBZ/TUBZ/PLANZ. To summarize the results of this example share repurchase analysis:

EPS: Call-monetized trust preferred securities lift expected EPS marginally more than CUBZ/TUBZ/PLANZ.

EPS Risk: Call-monetized trust preferred securities increase EPS risk significantly more than CUBZ/TUBZ/PLANZ.

Efficiency: CUBZ/TUBZ/PLANZ are more efficient than call-monetized trust preferred securities because they have a better trade-off between EPS and EPS risk.

More particularly, this example share repurchase analysis may be carried out as follows:

Simulating the Company

Horizon: In order to fully capture the impact of long-dated instruments, the simulation time horizon may encompass their behavior over essentially their entire lives. For this reason the analysis may simulate the company and the instruments over a 30-year horizon and compute the cumulative average behavior over the horizon.

Common investing decisions: In order to fairly compare one financing alternative to another over a time horizon, the analysis may assume that the company makes the same investing decisions throughout the horizon (identical assets) regardless of its capital structure. Because different strategies use different amounts of cash (an asset) over time, assets will begin to build up differently from one strategy to another.

Using excess earnings to repurchase equity: Assets can be kept the same between strategies by assuming that if an alternative requires less cash than another (say a base case), the company uses that excess cash to repurchase equity, bringing assets back in line. As an added benefit, using earnings to repurchase equity also prevents equity from building up differently from one strategy to another.

Summary of Assumptions

Analysis Concept: In order to accurately measure EPS risk, the Economic EPS impact of capital structure decisions may be calculated using Monte Carlo simulation. Of note, this simulation methodology is ideally suited for handling complexities, for example, of TUBZ/CUBZ/PLANZ: fluctuating dividends, path dependent tax basis, share price dependent tax recapture, and uncertain call/convert/mature outcome.

Assumptions for the Analysis: In this example analysis (which example is intended to be illustrative and not restrictive) the following assumptions are made regarding Company XYZ's capital structure, earnings, and dividends:

3.4 BN shares with market value of $85.5 BN, or $25 share price

EPS in line with 2002 I/B/E/S estimates of $1.65 per share, annual uncertainty going forward of $0.15 per share 2% dividend yield growing at an average rate of 7% per year 35% corporate tax rate Analysis of After-Tax Cash Flows The Capital Structure Efficient Frontier Model according to the present invention is used to analyze $1 BN share repurchase strategies, financed with alternatives including debt, equity, trust preferred securities, or Zero-put Contingent Convertibles (TUBZ/CUBZ/PLANZ).

The analysis begins by looking at each alternative from a debt perspective, by focusing on the after-tax cash flows. After-tax cash flows consist of all coupons, dividends, tax credits, and tax recapture.

Neither a final principal payment nor share delivery is included in the cash flow picture. The Economic EPS framework of the invention is better suited to handle this complexity.

Figure 5:
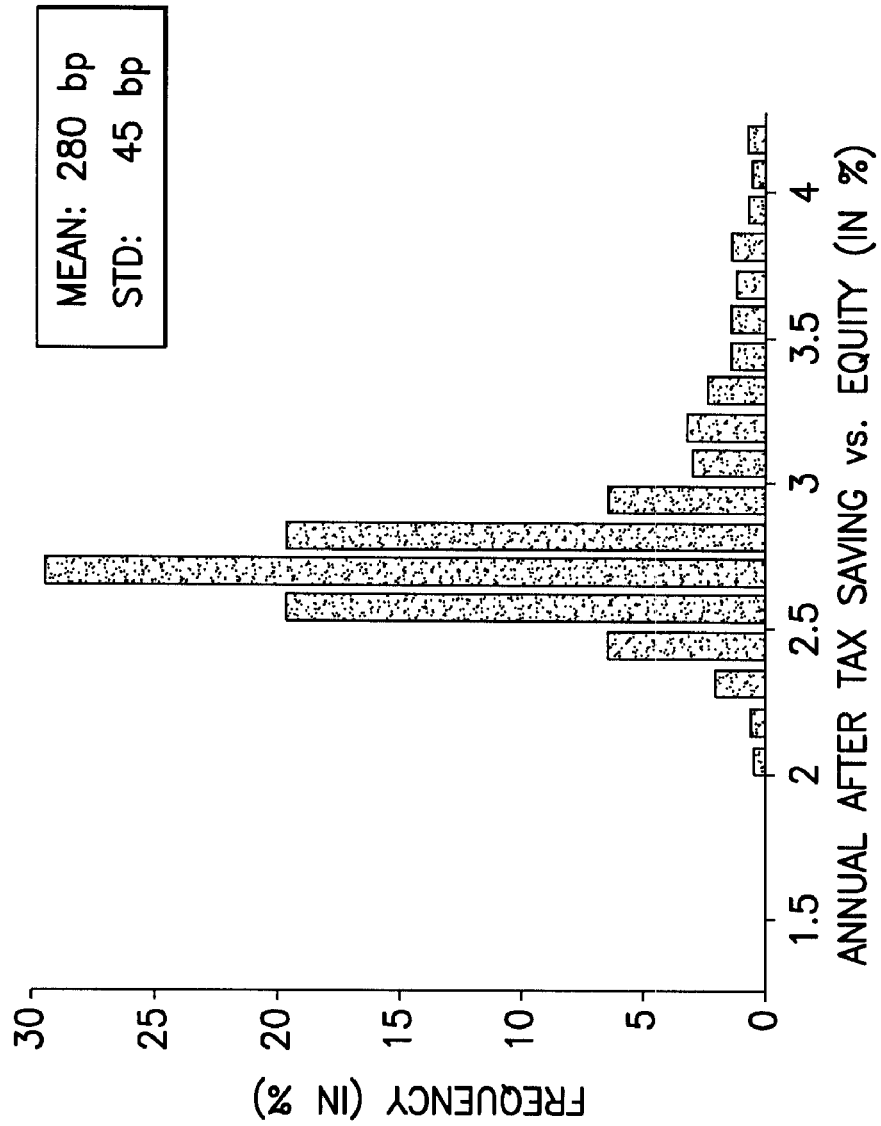
FIG. 5 shows a plot of after-tax cash flows savings (TUBZ vs. Equity) according to an embodiment of the present invention.

A calculation is performed regarding after-tax cash flows of TUBZ/CUBZ/PLANZ versus equity and trust preferred on a bond equivalent basis (see FIG. 5 and Table 7, below).

TABLE 7

After-Tax Cash Flows

| Instrument | Expected After-Tax Cash Flow (%) |
|---|---|
| TUBZ | 2.76 |
| CUBZ | 3.69 |
| PLANZ | 3.67 |
| Call-monetized QUIPS | 3.66 |
| Equity | 5.56 |

Analysis of Share Repurchase Strategies

The cash flows above do not fully capture the "all-in" cost and risk of strategy, since cash flows neither capture dilution nor properly distinguish dividend cash flows. Economic earnings per share provide a single metric for comparing both the cost and risk of debt, equity and hybrid equity alternatives all in the same unifying framework.

In this regard, the percentage change ("lift") in Company XYZ's Expected EPS versus EPS risk resulting from each share repurchase funding strategy is calculated. The strategies that form the Capital Structure Efficient Frontier by maximizing Expected EPS and minimizing EPS risk are then identified.

Of note, repurchasing shares with TUBZ/CUBZ/PLANZ increases the lift in Economic EPS with only a small increase in EPS risk. In this regard, TUBZ/CUBZ/PLANZ are superior to equity.

Of further note, repurchasing shares with Call-monetized Trust Preferred Securities increases the lift in Economic EPS slightly more, but increases EPS risk. From an EPS perspective, TUBZ/CUBZ/PLANZ are superior to call-monetized trust preferreds.

Figure 6:
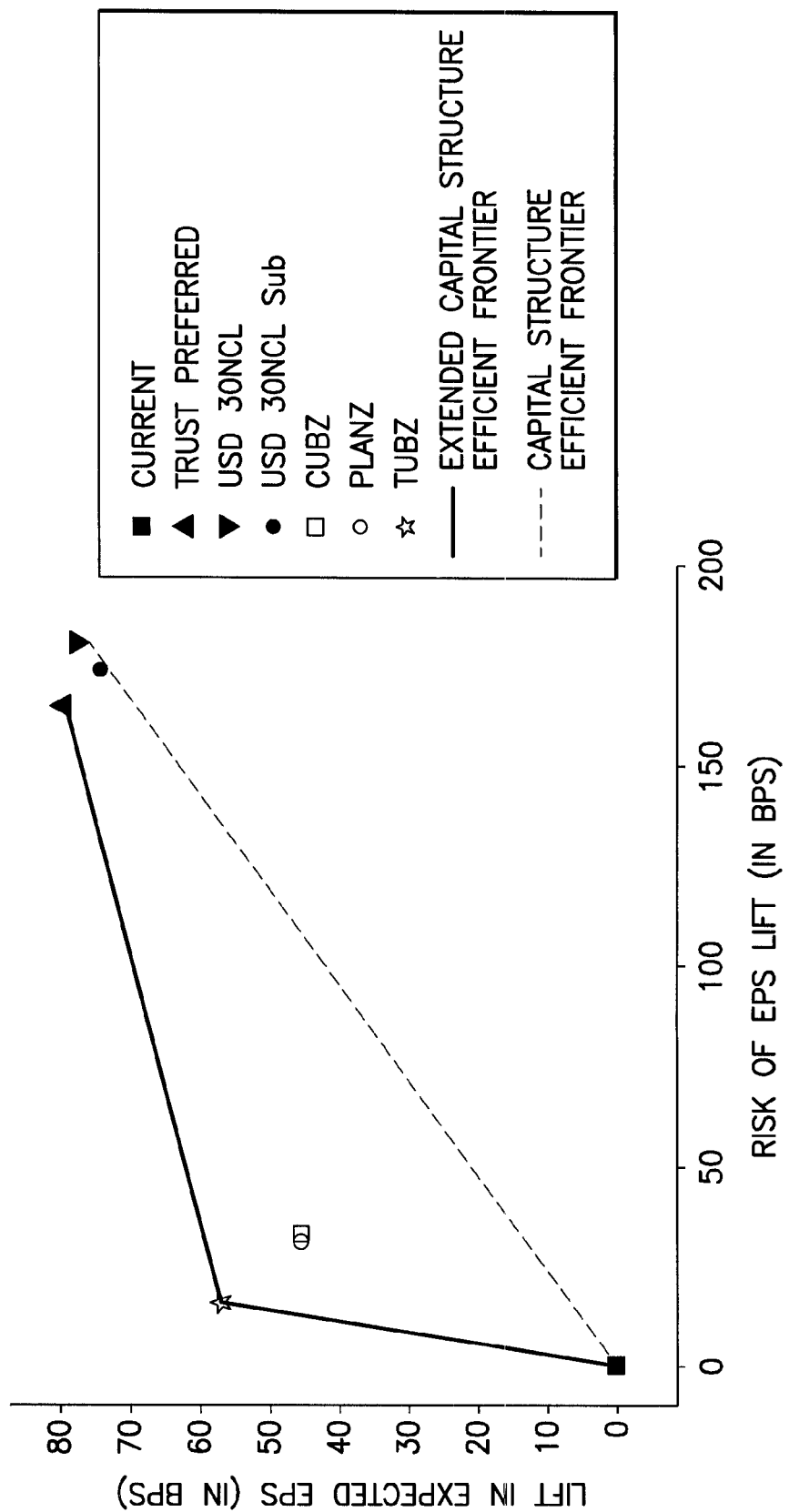
FIG. 6 shows a plot of a capital structure efficient frontier according to an embodiment of the present invention.
Figure 7:
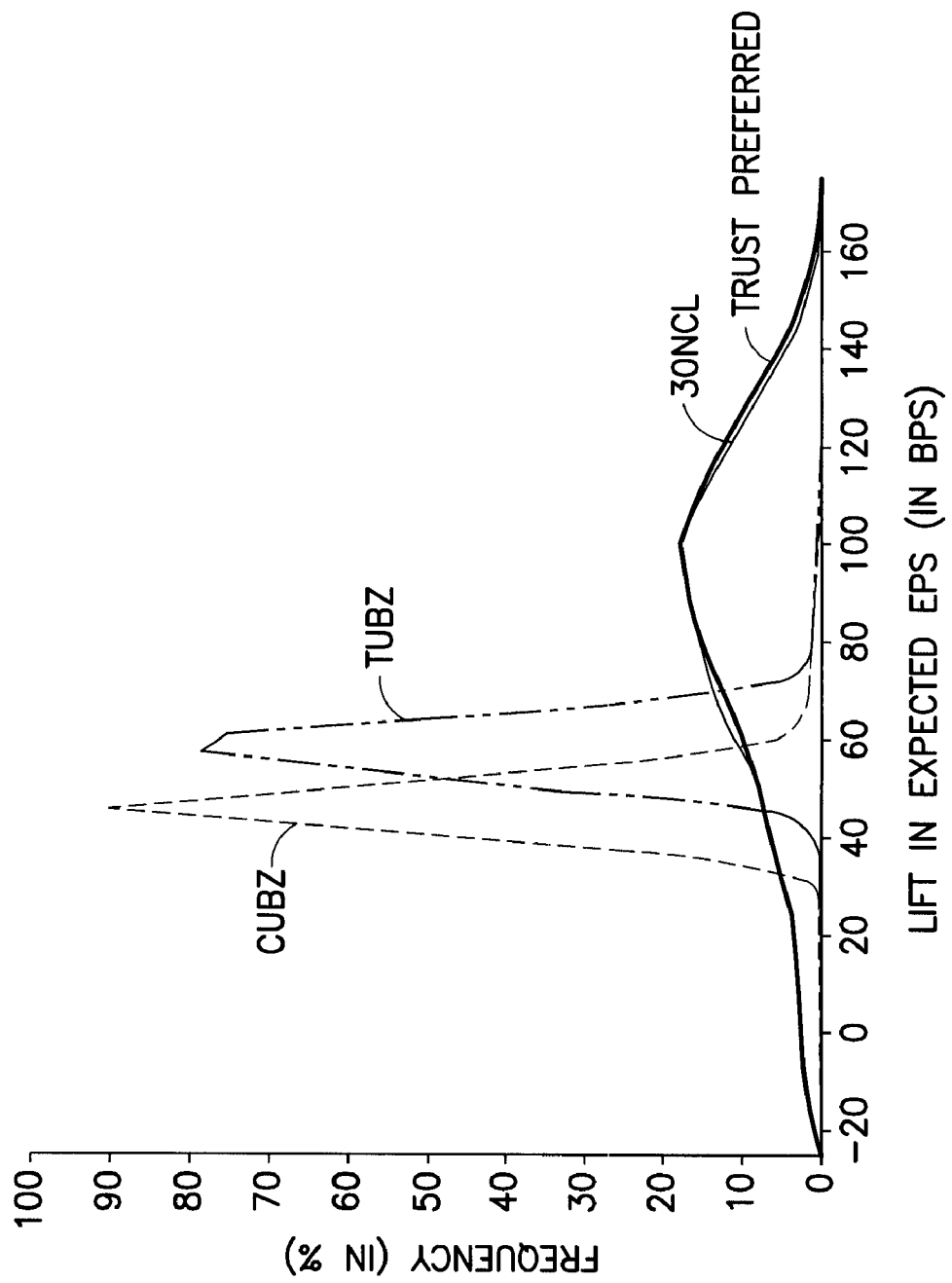
FIG. 7 shows a plot of distribution of EPS lift according to an embodiment of the present invention.

Referring now to simulation results, Table 8, below, summarizes the results of this example (showing the impact of $1 BN share repurchase on economic EPS); FIG. 6 shows the Capital Structure Efficient Frontier; and FIG. 7 shows the Distribution of Economic EPS lift).

TABLE 8

(Impact of $1 BN share repurchase on Economic EPS)

| Instrument | Percentage Change (Lift) in Expected EPS (bps) | Percentage Change (Lift) in EPS Risk (bps) |
|---|---|---|
| TUBZ | 57 | 15 |
| CUBZ | 46 | 31 |
| PLANZ | 46 | 30 |
| 30 Year Senior Debt | 76 | 179 |
| 30 Year Subordinated Debt | 75 | 172 |
| Call Monetized Trust Preferred | 80 | 164 |

Sensitivity Analysis of Share Repurchase Strategies

The economics of the TUBZ/CUBZ/PLANZ financed share repurchase transaction depends upon the assumed growth rate of the share price. In general, at higher growth rates the economics are expected to erode. A sensitivity analysis may be performed to determine at what growth rate TUBZ/CUBZ/PLANZ become unattractive relative to other alternatives.

Even at very high growth rates, TUBZ/CUBZ/PLANZ outperform the behavior of the underlying shares on risk-adjusted EPS basis. In this case, one benefit of the repurchase is just a free decrease in shares outstanding. A second benefit is the large tax deduction on the dividends. These benefits ensure that the TUBZ/CUBZ/PLANZ financed repurchase outperforms other strategies on the Capital Structure Efficient Frontier.

Figure 8:
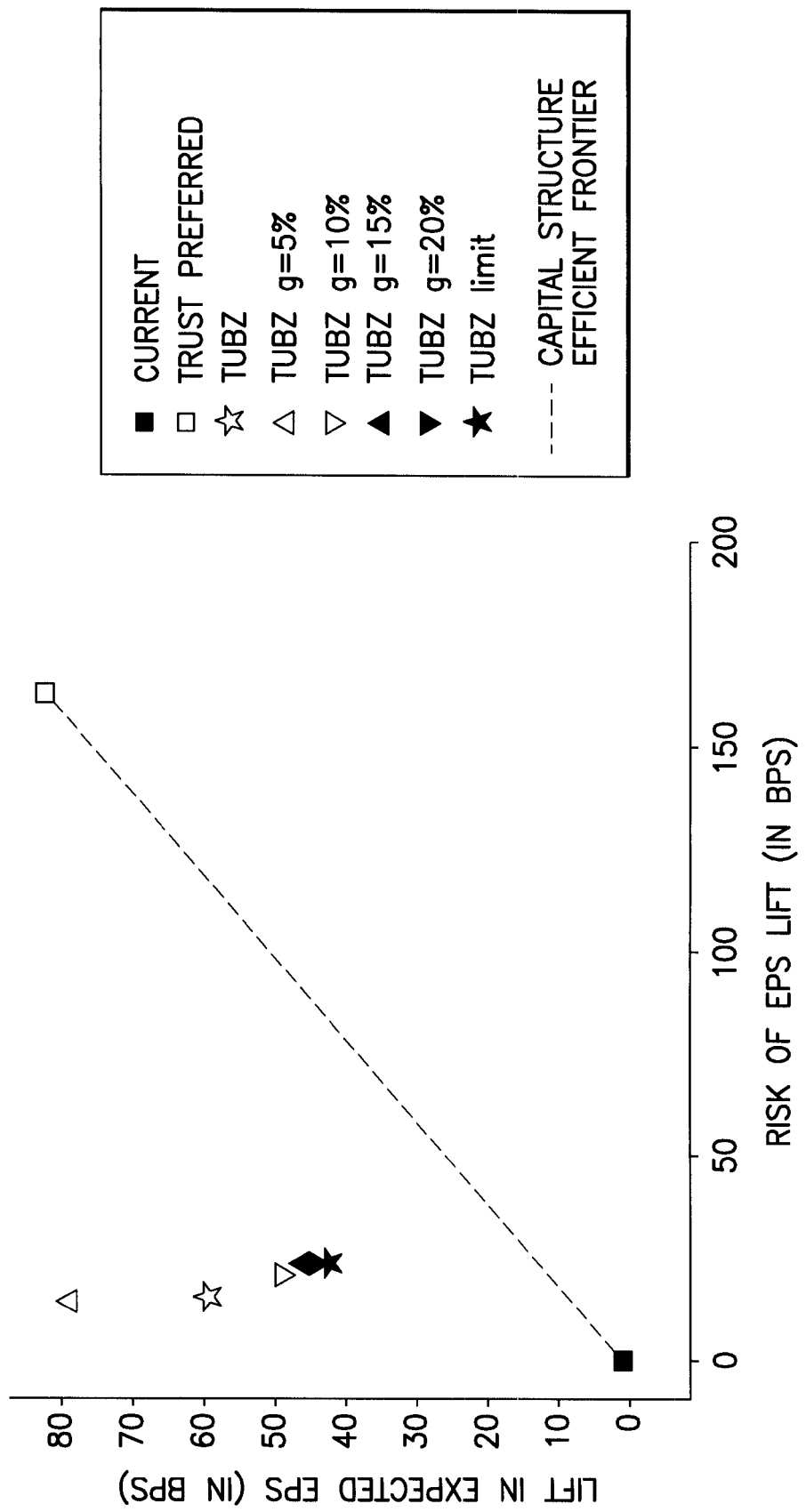
FIG. 8 shows a plot of a capital structure efficient frontier according to an embodiment of the present invention.

Of note, in this example, TUBZ dominate the Capital Structure Efficient Frontier under all equity growth assumptions (see FIG. 8).

As discussed above, one embodiment of the present invention relates to a quantitative framework/methodology for analyzing a company's existing capital structure and suggesting more efficient financing alternatives. By showing the equivalence between the dictum of modern finance theory that suggests that a company choose the capital structure that maximizes the value of the firm with the objective of optimizing the trade-off between economic earnings per share and its volatility, the framework/methodology marries sound theoretical foundation with an easily observable, measurable and implementable process.

Economic EPS (EEPS) and its volatility captures the cost/risk trade-off of all fixed income and equity-related alternative capital structures. A company should strive to bring its capital structure to the Capital Structure Efficient Frontier of strategies with the highest EEPS for given levels of EEPS risk. New financing alternatives claiming to be adding value to the existing capital structure only do so if they expand this Capital Structure Efficient Frontier. The Capital Structure Efficient Frontier of the present invention concludes that innovative financing products/strategies should be considered seriously if and only if they improve EEPS per unit risk more than what can be achieved by combining existing debt and equity strategies and therefore expand the Capital Structure Efficient Frontier.

Contingent convertible securities that are described and analyzed in detail below are examples (which examples are intended to be illustrative and not restrictive) of financial innovation that meet the criteria outlined above. By providing higher level of EEPS per unit of risk than other available strategies that combine debt and equity products helps to optimize corporate capital structures in current markets.

The examples below will focus on two main classes of contingent convertible securities: 1) Zero-put Convertibles (e.g., TUBZ, CUBZ and PLANZ); and 2) Zero-coupon Convertibles (e.g., STARZ, CARZ). After describing the basic features of the securities their behavior over time will be analyzed, highlighting the critical properties stemming from embedded options in their structure with respect to economic, accounting and tax-related variables. The rigorous simulation and optimization based analytic framework of the present invention is the appropriate microscope to get to the level of granularity that is needed to understand the pros and cons of any structure that claims to have superior properties to existing and well understood financial products.

Of note, Zero-put Convertibles are characterized by the absence of an investor put option. The TUBZ structure typifies this class and has the following features (CUBZ and PLANZ are variations on the TUBZ structure with modifications in the coupon cash flows, call/conversion schedule, and conversion premium):

Long maturity (e.g., 30 years).
Low non-contingent coupon (e.g., 3%).
Contingent coupon equal to dividend on underlying shares minus a spread (e.g., 1.0%), floored at zero.
Convertible at a conversion premium (e.g., 10%), provided the value of underlying shares is above a threshold (e.g., 110% of the conversion price).
Callable at par on or after a non-call period (e.g., year 5).
Not putable by investor.

Zero-coupon Convertibles are characterized by a low coupon. The CARZ structure typifies this class and has the following features:

Long maturity (e.g., 30 years).
Zero non-contingent coupon.
Proceeds may be less than principal (e.g. 10% discount, accreting at 2% interest rate).
Contingent coupon equal to zero until first put date, and equal to dividend on underlying shares thereafter, provided the trading price of the CARZ exceeds a threshold (e.g., 120% of principal amount).
Convertible at a conversion premium (e.g., 25%) on or after a non-convert period (e.g., 5 years) provided value of underlying shares is above a threshold (e.g., 110% of conversion price).
Callable at par on or after a non-call period (e.g., 5 years).
Putable at par on discrete put dates (e.g., every 5 years).
Interest adjustment provision. On each put date, if the value of underlying shares is below the conversion price, interest adjustment is triggered: (1) on the first adjustment, the conversion price is permanently elevated (e.g., tripled); (2) the contingent coupon is reset to an interest rate so that CARZ are judged to be worth, for example, 102% of principal value; (3) the dividend pass through is turned off until the next put date; and (4) the issuer's call is turned off until the next put date.

STARZ is a strategy that combines a CARZ structure with a purchased variable share repurchase contract. The CARZ underlying a STARZ strategy is issued typically at par (0% discount, 0% interest rate) by reducing the conversion premium (e.g. 12.5%). The variable share contract of this example has the following features:

Purchased by company for a premium (e.g., for 10% of CARZ principal). The net proceeds are therefore less than the principal of the CARZ (e.g., 90% of CARZ principal).
Maturity matching the first put/call date of the CARZ (e.g., 5 years).
Company receives payment in the form of shares. The number of shares delivered varies within a limited range depending upon the share price at maturity (e.g. 0 shares if share price $\leq 112.5\%$ of current share price, 2.6 shares if share price $\geq 147\%$ of current share price, and varying in between).

Since, in this example, STARZ turn out to be the most attractive economically, the following discussion will center around an analysis of this structure. The framework/methodology of the present invention, however, is applicable to any of these structures (as well as other financing mechanisms), and throughout the discussion certain results for other alternatives and certain differences therebetween will be noted.

As a general outline, the key features of these contingent convertibles will be discussed below first and the factors driving their economics will be discussed (including their intricate tax treatment). Next the instruments will be analyzed in a probabilistic simulation framework according to the present invention, comparing their cash flows and dilution impact with both debt and equity. Finally, cash flow and dilution effects will be combined in an Economic EPS framework embodiment according to the present invention (which allows comparison of capital structure alternatives including contingent convertibles, debt, and equity using a single unifying economic metric).

As will be seen below, for most tax-paying issuers, economically, contingent convertibles are lower cost, less dilutive alternatives to combinations of debt and equity (Contingent convertibles may or may not be suitable as a replacement for equity from a ratings perspective. While Zero-put structures receive some rating agency equity credit due to the absence of an investor put, Zero-coupon structures receive no equity credit). With their favorable cost/risk trade-off, these structures broaden the range of financing alternatives and significantly expand the Capital Structure Efficient Frontier.

Referring now to tax treatment, it is noted that interest on convertible bonds is generally tax deductible, but since the coupons are typically lower than on straight debt, the tax deduction has limited economic value. This discussion assumes that contingent convertibles will meet the requirements for contingent payment debt treatment, which allows the issuer to take tax deductions based upon interest accrued at the issuer's higher straight debt rate rather than at the lower stated coupon rate (see IRS Revenue Ruling 2002-31; See also §1.1275-4 of the Income Tax Regulations regarding contingent payment debt instruments). This tax treatment greatly enhances the attractiveness of these structures as low cost alternatives to ordinary equity.

Deducting interest based upon the straight debt rate does not mean that the tax deduction is equal to that of straight debt with the same principal. Rather, the tax deduction is calculated based upon a level yield methodology. Each year the tax-deductible interest expense is equal to the level yield multiplied by a tax basis, in much the same way that GAAP interest expense for a fixed rate bond is equal to the level yield multiplied by bonds payable. In both cases, the calculation of the basis is based upon projections of the coupon cash flows (The evolution of the tax basis can be calculated when the instrument is issued, by estimating expected future (perhaps, probability weighted) contingent cash flows and tax deductions, assuming a constant stock growth rate. The stock growth rate is chosen so that the IRR of the projected pre-tax cash flows is equal to the straight debt rate). But, whereas the coupon cash flows can be projected for the fixed rate bond, they will differ from projections for the contingent convertible. As a result, for the purposes of calculating taxes on contingent convertibles, the tax deductible interest expense is adjusted each period for any difference between actual and projected cash flows.

Generally speaking, under GAAP, if the actual interest paid in cash or interest payable accrued on a fixed rate bond in a year is less than the interest expense, bonds payable is adjusted upward to account for the difference. Similarly for the tax treatment of contingent convertibles, if the actual cash paid or payable is less than the tax deductible interest expense, the tax basis is increased. Applying the same level yield to this new tax basis results in a higher tax deduction in the next year, which in turn increases the tax basis for the following year. As long as the actual cash flow remains below the deductible expense, the tax basis continues to accrete over time, producing a chain reaction of increasing tax deductions.

Under GAAP, if at maturity, the amount paid to retire the bond is less than bonds payable, then the excess amount is recognized as a gain. Similarly, if at termination, the amount paid to retire a contingent convertible is less than the tax basis, then the excess amount is recognized as a taxable gain, subject to tax recapture. If the contingent convertible terminates with the delivery of the principal, then tax is based upon the difference between the tax basis and the principal. If, however, it terminates with the delivery of shares, then tax is based upon the difference between the tax basis and the value of the shares. As long as the value of the shares exceeds the projected tax basis, there will be no tax recapture.

As an example (which example is intended to be illustrative and not restrictive), Company XYZ raises $90 through a STARZ strategy with the properties described above. The underlying CARZ has a principal of $100 and the variable share repurchase contract has a premium of $10. We assume that interest on the CARZ is deductible based upon a 7.00% straight bond yield and that the corporate tax rate is 35%. Table 9, below, shows the cash flows and tax calculations under a scenario in which Company XYZ initially pays dividends based upon a 1.50% dividend yield and dividends grow at 7% per year.

TABLE 9

STARZ Cash Flows for a Single Scenario

| | Pre-Tax Cash Flow | | Tax Credit Calculation | | | | | |
|---|---|---|---|---|---|---|---|---|
| Year | Underlying Share Value | Coupon Cash Flow | Projected Cash Flow | Projected Expense | Deductible Expense | End of Year Basis | Credit | After-Tax Cash Flow |
| 1 | 93.51 | 0.00 | 0.00 | 7.00 | 7.00 | 107.12 | 2.45 | −2.45 |
| 2 | 98.37 | 0.00 | 0.00 | 7.50 | 7.50 | 114.75 | 2.62 | −2.62 |
| 3 | 103.49 | 0.00 | 0.00 | 8.03 | 8.03 | 122.93 | 2.81 | −2.81 |
| 4 | 108.87 | 0.00 | 0.00 | 8.60 | 8.60 | 131.68 | 3.01 | −3.01 |
| 5 | 114.53 | 0.00 | 0.00 | 9.22 | 9.22 | 141.06 | 3.23 | −3.23 |
| 6 | 120.49 | 1.81 | 4.02 | 9.87 | 7.66 | 147.02 | 2.68 | −0.87 |
| 7 | 126.75 | 1.90 | 4.50 | 10.29 | 7.69 | 152.91 | 2.69 | −0.79 |
| 8 | 133.34 | 2.00 | 4.55 | 10.70 | 8.15 | 159.17 | 2.85 | −0.85 |
| . | | | | | | | | |
| . | | | | | | | | |
| . | | | | | | | | |
| 29 | 386.64 | 5.80 | 6.94 | 26.45 | 25.32 | 397.76 | 8.86 | −3.06 |
| 30 | 406.74 | 6.10 | 6.96 | 27.84 | 26.98 | 419.00 | 9.44 | −3.34 |

In year 1, Company XYZ pays $0.00, while deducting interest expense of $7.00 (=7.00% times a tax basis of $100). No adjustment is necessary since the actual cash flow is equal to the projected cash flow. The tax basis grows to $107.12 (=$100+$7.00−$0.00+semi-annual compounding). This sets the chain reaction in motion. In year 2, Company XYZ pays $0.00 while deducting $7.50 (=7.00%×$107.12), and the tax basis grows further to $114.75 (=$107.12+$7.50−$0.00+semi-annual compounding).

Over time this is how the cash flows evolve. In year 1, the tax credit is 2.45 (=7.00×35%) and the after-tax cash flow is −2.45 (=$0.00−$2.45). In year 2, the tax credit is 2.62 (=7.50×35%) and the after-tax cash flow is −2.62 (=$0.00−$2.62).

Figure 9:
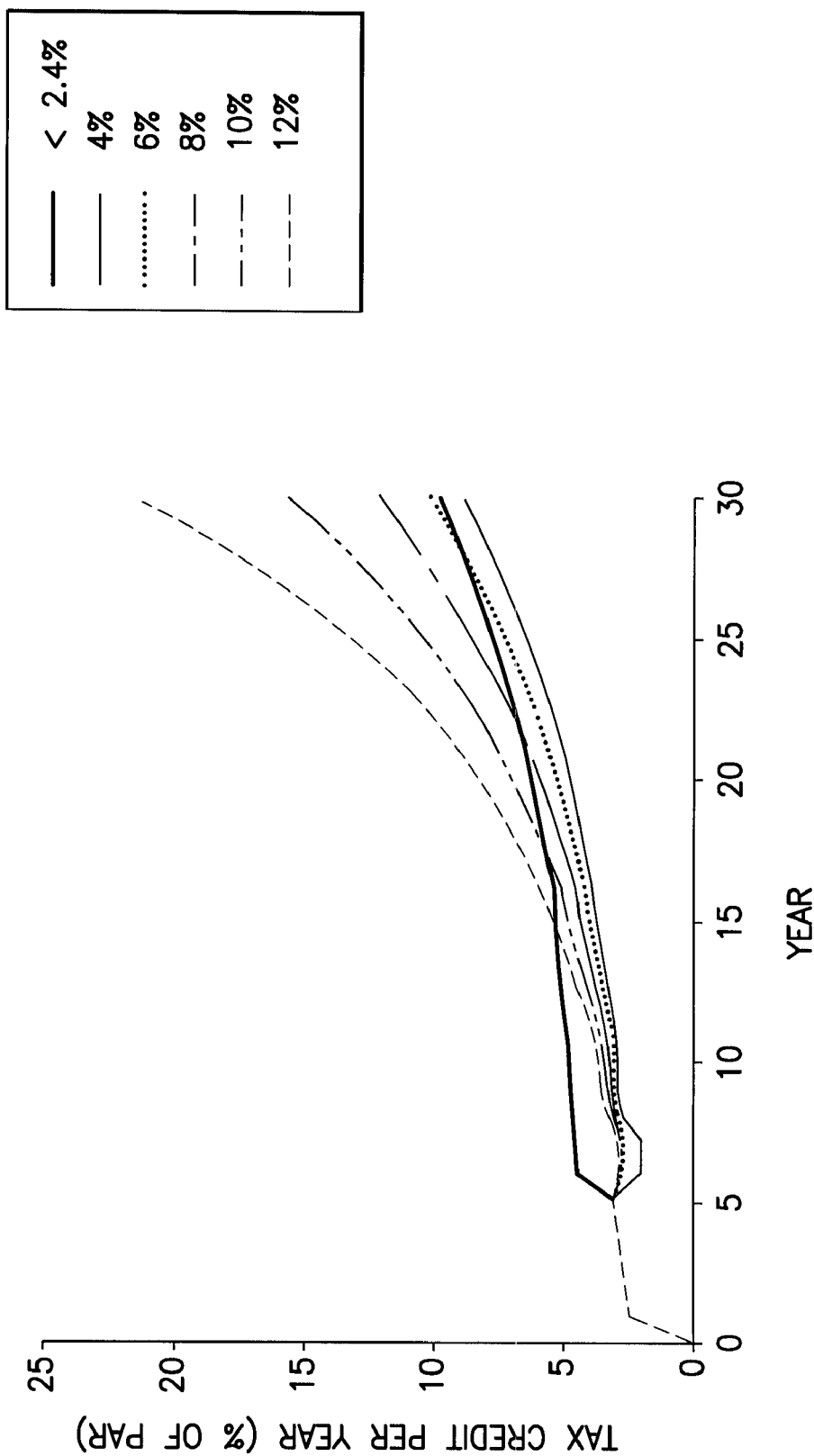
FIG. 9 shows a plot of sensitivity of tax credit to dividend growth rate according to an embodiment of the present invention.

A number of factors affect the tax credit enjoyed by Company XYZ:

Through year 5, projected and actual cash flows are identical and equal to zero. As a result, projected and actual tax-deductible expense are the same. In this particular scenario, starting in year 6, the contingent coupon is payable, and actual and projected cash flow differ. Actual cash flows fall short of projections, and the tax deductible expense needs to be adjusted downward. The actual tax credit appears to depend sensitively on the growth rate of dividends (See FIG. 9). Tax credits would be lower for lower growth rates. From the table, however, it is apparent that even in the worst case, in which dividends are zero, the actual tax credit would remain high.

In fact however, if low dividends are due to low stock prices, the interest adjustment provision in the underlying CARZ would be triggered at the first put date, essentially converting the security into a bond. Actual payments would then likely be higher than projected payments. (See the low growth scenario in FIG. 9).

Figure 10:
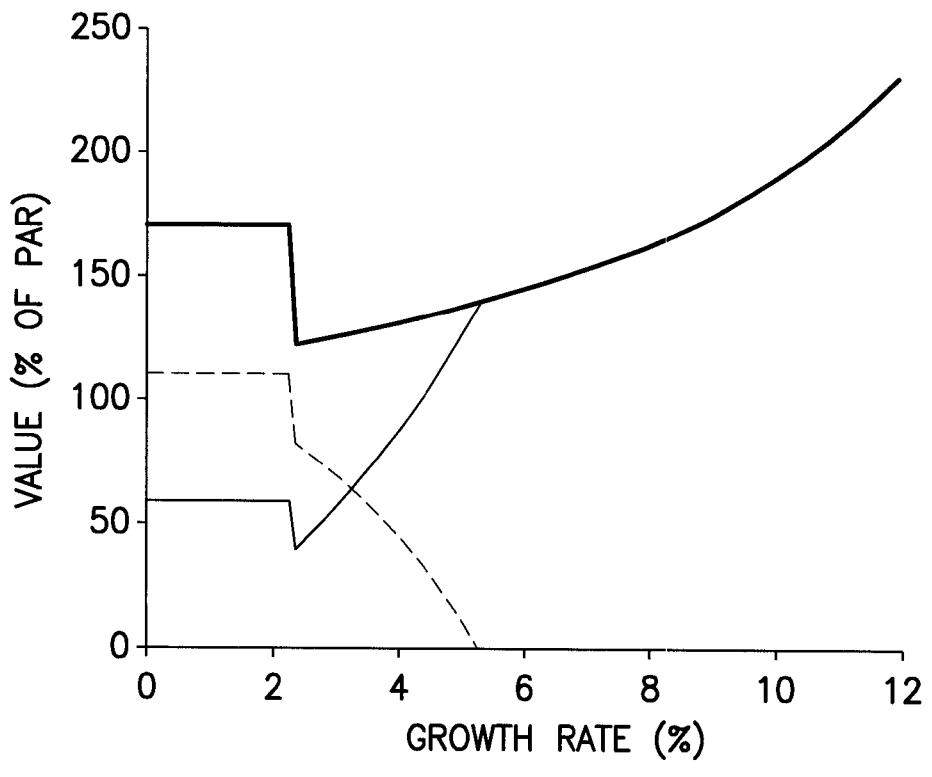
FIG. 10 shows a plot of sensitivity of tax recapture to growth rate according to an embodiment of the present invention.

Company XYZ may have to pay tax recapture if the underlying CARZ is converted to shares that are worth less than the projected tax basis. FIG. 10 illustrates how the tax recapture depends upon the stock growth rate (assuming that the STARZ is not called early). In this example, as long as the stock price grows at an average rate of 5.24% or higher per year over 30 years, the underlying shares will exceed the $419.00 projected tax basis, and there would be no tax recapture. Company XYZ keeps fully all accumulated tax credits (net tax credit=cumulative tax credit in FIG. 10). Even if the growth rate is slower than this threshold, however, the accumulated tax credits will be larger than the tax recapture. The interpretation is that Company XYZ is simply returning a portion of the excess tax credits that it has enjoyed through the life of the instrument. The worst case outcome is that the price of the underlying CARZ falls below par, triggering the interest adjustment, and tax recapture is based upon the difference between the projected tax basis and par.

If Company XYZ's tax rate were lower, the corresponding tax credits would be lower and the after-tax cash flows would be less favorable. A company with a low tax rate would benefit less by tax-advantaged structures such as STARZ.

Of note, the tax treatment of other Zero-coupon and Zero-put contingent convertibles is essentially the same as for STARZ.

Referring now to an investor conversion option, it is noted that in this example the investor has the right to convert the underlying CARZ to shares on or after year five if the share price is 10% or higher than the conversion price. However, the investor receives no immediate benefit by doing so because it would then simply receive the same dividends that it would be receiving already, and would simply be giving up its put option to receive par should the share value fall below par. While the investor would never convert early, converting at maturity may be very beneficial. The investor would convert at maturity as long as the share price exceeds the conversion threshold at maturity. With reasonable conversion premium and annual share appreciation, this scenario is very likely.

Likewise an investor is unlikely to convert a Zero-put Contingent Convertible early. In the TUBZ structure, the investor has the right to convert to shares at any time if the share price is 10% or higher than the conversion premium. But, by converting, the investor would simply be giving up a spread (e.g., 2%) and a floor (e.g., 1%) on the dividend. CUBZ typically have a higher conversion premium (e.g., 20%) than TUBZ, while PLANZ typically have a conversion premium that is determined at the end of a non-convert period (e.g., 10%-30%, depending upon the stock price at year 3).

Referring now to an investor put option, it is noted that the investor also has the right to put the underlying CARZ at par (e.g., every five years). However, the CARZ is structured to deter the investor from doing so by providing the investor with the economic benefits of putting the security without returning capital to the investor. When the investor would want to put the security to receive par, the interest adjustment essentially delivers to the investor a bond that is worth a small premium above par. This interest adjustment makes the security a more permanent form of capital. However, it also makes the cash flows highly sensitive to the stock price on the put dates (Zero-put Contingent Convertibles are not putable by the investor).

Referring now to an issuer call option, it is noted that the issuer has the right to call the STARZ at par (e.g., on or after year 5). If the issuer does call the bond, the investor would most likely exercise its conversion option, resulting in a forced conversion. As a result, by calling, the issuer trades the after-tax cash flows of the underlying CARZ for the dividends on the underlying shares. Given the tax benefits of the CARZ, it seems unlikely that the issuer would have any incentive to do this.

The issuer would similarly have little incentive to give up its tax deduction by calling and forcing conversion of a Zero-put Contingent Convertible security early.

Referring now to an issuer variable share repurchase contract, it is noted that in the STARZ strategy, the issuer pays investors in advance for the delivery of a number of shares at the first put/call date of the underlying CARZ, with the number of shares depending upon the share price on that date. Economically, this transaction is unrelated to the rest of the structure (the CARZ portion), and is simply a hedging transaction on the side designed to increase the effective conversion premium. The purchase of this stock option is essentially a nontaxable equity transaction.

Referring bow to other issuer options, it is noted that Zero-put securities may have other modifications. For example, in the TUBZ structure, the dividend is typically floored at some minimum level (e.g., 1.0% of par value). This option gives the investor a small measure of protection against a deterioration in the company's dividends. However, by increasing the guaranteed portion (non-contingent) of the coupon, the floor ensures that the pre-tax debt content of the TUBZ is over 50%. Debt content greater than 50% is a guideline for receiving contingent payment debt treatment. By comparison, the CUBZ structure does not include a dividend floor option. To compensate for the reduction in debt content, the CUBZ is structured with a higher non-contingent coupon (e.g., for the first three years).

This discussion will now turn to valuation analysis. More particularly, it is noted that valuing Zero-put Contingent Convertibles is not straightforward, particularly since the value for both the issuer and investor depends upon the decisions of the issuer, which take into account tax considerations. To build some intuition regarding the factors driving the economics, this portion of the discussion will be directed to estimating the net theoretical value of the STARZ package to both the investor and the issuer.

Referring now to a value to investor, it is noted that from the investor's perspective, the STARZ package looks a lot like equity, with enhancements (see Table 10, below).

TABLE 10

STARZ Valuation Analysis (35% Tax Rate)

| | Investor | Issuer | Total |
|---|---|---|---|
| Underlying Stock | 88.89 | −88.89 | 0.00 |
| Adjustment | −16.67 | 16.67 | 0.00 |
| Investor Put | 19.29 | −19.29 | 0.00 |
| Issuer Call | −0.60 | 0.60 | 0.00 |
| Tax Credit | 0.00 | 51.27 | 51.27 |
| Value | 90.92 | −39.65 | 51.27 |
| Proceeds | −90.00 | 90.00 | 0.00 |
| Net Theoretical Value | 0.92 | 50.35 | 51.27 |

Figure 11:
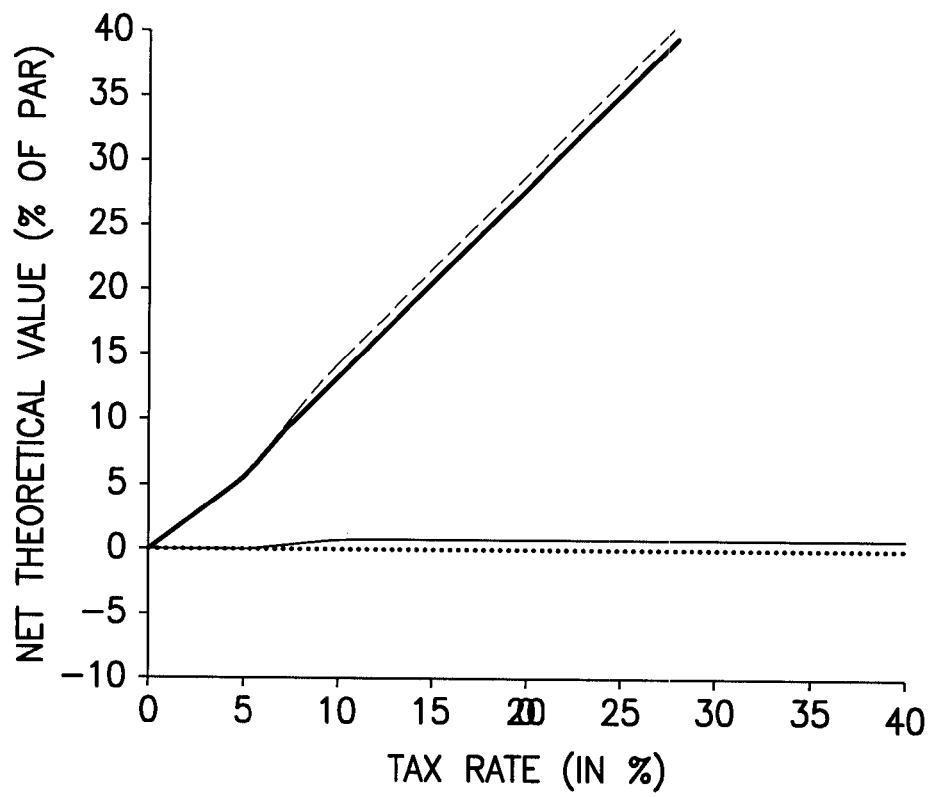
FIG. 11 shows a plot of STARZ value vs. tax rate according to an embodiment of the present invention.
Figure 11:
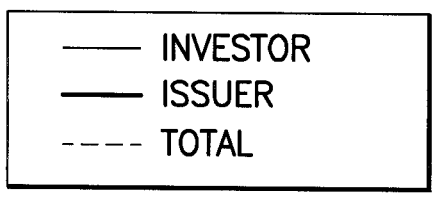

Underlying each $100 principal (of the underlying CARZ) are shares worth, in this example, $88.89 (=$100/(1+12.5% Conversion Premium)). For the most part, the investor receives dividends on these shares and also participates in the appreciation of these shares, just like common shares. However, some adjustments are necessary. For the first 5 years, for example, the investor receives no dividends and thereafter receives dividends only if the value of the shares exceeds a threshold. Also, the investor may have to deliver some shares (e.g., at year 5) because of the variable share repurchase contract. The value to the investor must be adjusted downward by, for example, $16.67 for these effects. This is compensated for by the investor's put option, or equivalently the interest adjustment, which is worth, in this example, $19.29. The investor is also short the issuer's call option. If the STARZ is called early, the investor loses the remaining benefits of the put option. However, when the tax rate is sufficiently high, the issuer is unlikely to exercise early. For the purposes of this discussion, the effective cost of the call option is estimated to be only $0.60, resulting in total value to the investor of $90.92 (=$88.89×16.67+19.29−1.52). The net theoretical value of $0.92 (=$90.92−90.00) is defined as the difference between the value of the STARZ and the price paid for it. For the investor, the net theoretical value is relatively insensitive to the issuer's tax rate. At low tax rates, the call option is more likely to be exercised very early, since the issuer would no longer be accruing valuable tax benefits. The cost of the call option increases slightly, and the value of the STARZ for the investor decreases, as the tax rate is decreased and the issuer has less incentive to keep the STARZ outstanding (see FIG. 11). In fact, at zero tax rates the net theoretical value to the investor falls to zero.

Referring now to value to issuer, it is noted that if the STARZ has positive net value to the investor, it might seem that it should have negative net value to the issuer. Indeed it would, if the transaction were a zero-sum game, as it is when tax rates are zero. At zero tax rates, STARZ has zero net theoretical value to the issuer. Non-zero tax rates, however, introduce a third party, the government, that changes the economics for the issuer and the investor. The issuer receives tax credits from the government that increase with the tax rate. For example, at a 35% tax rate, the issuer receives a tax credit of $51.27, so that the net theoretical value of the STARZ issuance to the issuer is $50.35, equal to the proceeds of the issuance plus the tax credit minus the value of the liability (=$90.00+51.27−90.92).

The transaction between the issuer and the investor is no longer a "zero-sum" transaction because the government contributes value equal to the tax credits on the STARZ. The terms of the STARZ, or pricing, determine how this added value is shared between the investor and issuer. The pricing clearly favors the issuer; with the issuer accruing almost all the benefits of the tax credits. With appropriate pricing, the STARZ can have positive net theoretical value for both the issuer and the investor (The government may also tax the investor's income. As long as this tax liability is smaller than the issuer's tax credit, there is a net tax credit that can be shared between the issuer and the investor).

A similar analysis applies to Zero-put convertibles. Table 11, below, shows an example for the TUBZ structure.

TABLE 11

TUBZ Valuation Analysis (35% Tax Rate)

|  | Investor | Issuer | Total |
| --- | --- | --- | --- |
| Underlying Stock | 90.91 | −90.91 | 0.00 |
| Adjustment | −1.64 | 1.64 | 0.00 |
| Interest | 24.93 | −24.93 | 0.00 |
| Issuer Call | 1.53 | −1.53 | 0.00 |
| Tax Credit | 0.00 | 42.72 | 42.72 |
| Value | 118.01 | −75.29 | 42.72 |
| Proceeds | −100.00 | 100.00 | 0.00 |
| Net Theoretical Value | 18.01 | 24.71 | 42.72 |

The investor put and the adjustment play a much smaller (or no) role in these securities. In their place, the interest component associated with the non-contingent coupon has significant value to the investor.

The discussion will now turn to EEPS Framework and Simulation Analysis. More particularly, because of their hybrid nature, a meaningful analysis of contingent convertibles must include both debt and equity-related factors. From the debt perspective, coupon cash flows are paid out during the life of the instrument, incurring a negative impact on the issuer's earnings. From the equity perspective, contingent convertibles immediately reduce the earnings participation for existing shareholders, because these convertible holders are entitled to a share of earnings paid out in the form contingent coupons related to the dividend, as well as retained earnings. In order to contextualize hybrids and be able to compare them with both pure debt and pure equity instruments, under an embodiment of the EEPS Framework of the present invention earnings and dilution are included and combined to achieve a unified measure that can be employed as an effective tool to aid with capital structure decisions.

In order to accurately measure and analyze the cash flows, dilution effects, and risk characteristics of contingent convertibles, an embodiment of the present invention may utilize a Monte Carlo simulation methodology. Within such simulation model, a large number (e.g., 10,000) stock price and interest rate paths may be generated using historical volatilities and correlations as well as the current term structure of interest rates. Along each path, the behavior of the instrument may be computed given the behavior of stock prices and interest rates along that path. Through this methodology, the after-tax cash flows over each path may be calculated and the resulting economics may be measured against alternative strategies for the issuer. The expected economics of the instrument may be based upon the average behavior of the instrument across all (e.g., 10,000) paths. Meanwhile, the full distribution gives a perspective on how much the actual economics may differ from its expected value and the probability of this occurring.

Continuing now with the example in which Company XYZ raises money through a STARZ issuance strategy, the discussion will further assume that Company XYZ's stock price is $80.0 per share.

In order to fully capture the impact of long-dated instruments, the simulation should use a time horizon that encompasses their behavior over their entire lives. For this reason, the company and the instruments may be simulated over a 30-year horizon and the cumulative average behavior may be computed over the horizon. In order to fairly compare one financing alternative to another over such an extended time horizon, the simulation may need to make the assumption that the company makes the same investing decisions throughout the horizon (identical assets) regardless of its capital structure. Because different strategies use different amounts of cash (an asset) over time, assets will begin to build up differently from one strategy to another. Assets may be kept the same between strategies by assuming that if an alternative requires less cash than another (say the do-nothing strategy), the company uses that excess cash to repurchase equity, bringing assets back in line. As an added benefit, using earnings to repurchase equity also prevents equity from building up differently from one strategy to another.

Figure 12:
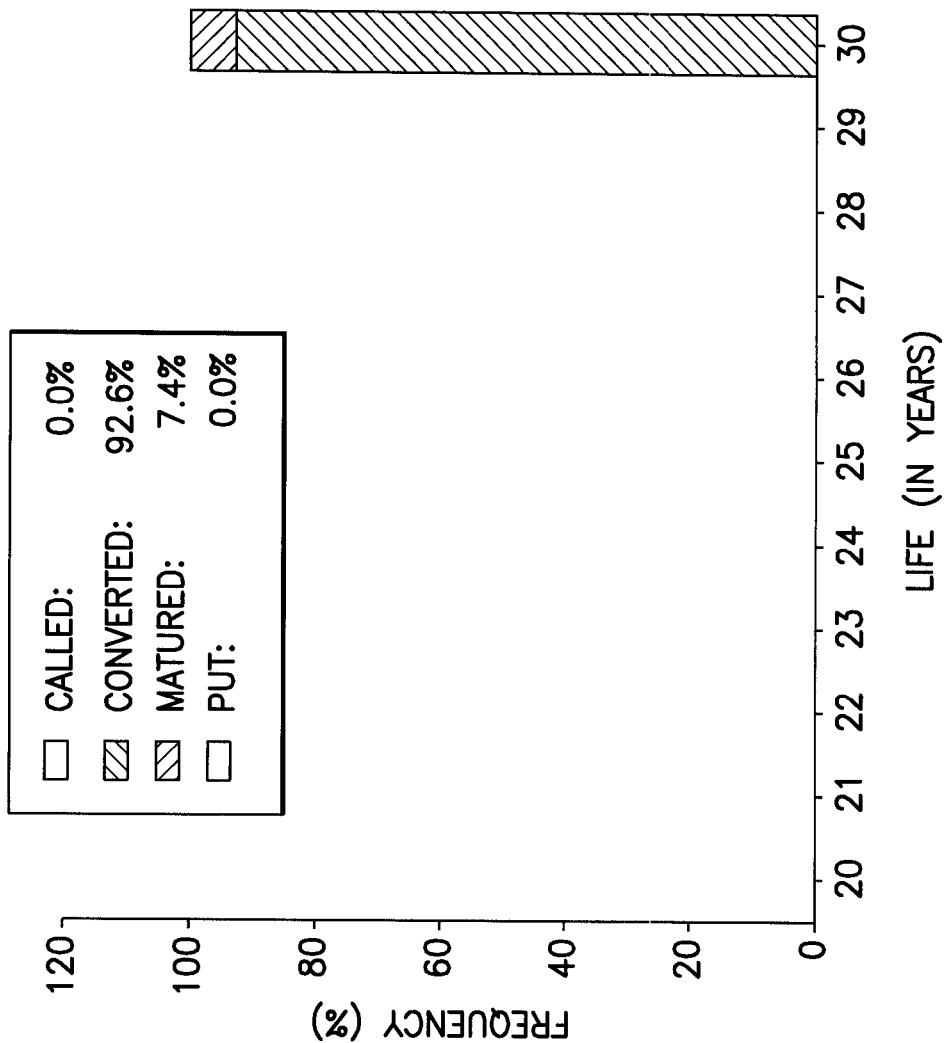
FIG. 12 shows a plot of life of STARZ according to an embodiment of the present invention.

Referring now to expected life, it is noted that before entering into a detailed analysis of the earnings and dilution impact of the STARZ, it is useful to enumerate the possible ways in which the underlying CARZ can terminate and to assess the probability of each (see FIG. 12, for example):

Called/Forced Conversion: The security is called by the issuer before the final maturity date, forcing the investor to convert. The issuer delivers the underlying shares to the investor.

Put: The security is put by the investor before the final maturity date and terminates early.

Converted: The security is converted by the investor at maturity. The issuer delivers the underlying shares to the investor. This includes scenarios in which the conversion price has tripled as a result of an interest adjustment and the share price recovers enough so that the conversion option is in the money.

Matured: The security is retired at maturity. The issuer repays the principal to the investor. This includes scenarios in which the interest adjustment is in effect until maturity.

From the simulation results of this example, it is clear that for Company XYZ, the CARZ underlying a STARZ strategy behaves much like equity, ultimately converting 94% of the time into the underlying shares, and paying a contingent coupon economically equivalent to the dividend for much of the time. This may be surprising given the potential for the conversion price to triple as a result of the interest adjustment provision. But even at the elevated conversion price, at reasonable growth rates, most of the time there is sufficient time for the stock price to recover and drive the conversion option in-the-money. From a tax perspective, the STARZ behaves much like debt, since most of the time—more than 99% of all outcomes—it survives until final maturity, allowing the issuer to enjoy a full 30 years of enhanced tax deductions. The likelihood of the STARZ being put or called early in this example is less than 1%.

Referring now to debt perspective and after-tax cash flows, it is noted that the STARZ strategy will be tackled first from a debt perspective, and will focus initially on the cash flows (The focus will be on the coupon and tax cash flows, and will set aside for the moment the termination "cash flows" associated with repaying the principal or delivering shares). The after-tax cash flows of contingent convertibles are not straightforward for several reasons:

The pre-tax cash flow may depend upon the dividends paid on underlying shares or on the interest adjustment.

The tax recapture cash flow may depend upon the share price at termination.

The maturity of the instrument is uncertain.

The simulation framework of an embodiment of the present invention is well suited to handle these complexities, generate a realistic distribution of the after-tax cash flows of these instruments, and compare these cash flows with debt and equity. In order to capture the full spectrum of possible outcomes, the simulation framework may compare the after-tax cash flows of contingent convertibles with debt and equity over a 30-year analysis horizon.

Figure 13:
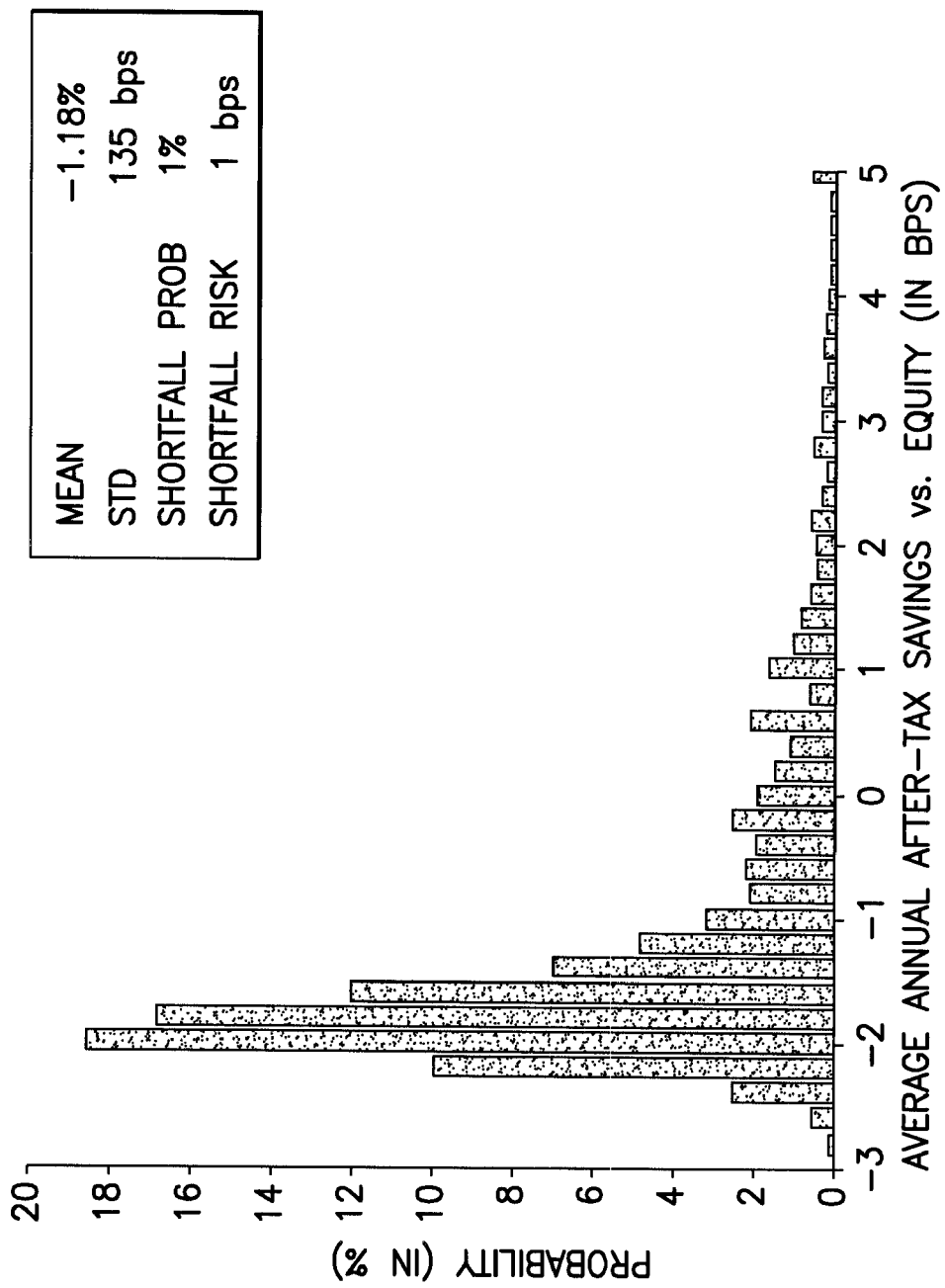
FIG. 13 shows a plot of after-tax cash flows vs. debt according to an embodiment of the present invention.

FIG. 13 shows the distribution of average annual after-tax cash flows for the STARZ of this example over the 30-year horizon. The STARZ are compared with 30-year senior debt. On a cash flow basis STARZ compares favorably with 30-year debt, with an expected average annual aftertax cash flow of −1.18% compared with 4.55% (=7.00% pre-tax coupon×65% tax effect) for senior debt. For Company XYZ, the STARZ cash flows exceed the debt cash flows only 1% of the time and has a shortfall risk relative to debt of only 1 bps (Shortfall risk relative to a benchmark is defined here as the probability that the cash flow exceeds the benchmark multiplied by the expected excess).

Figure 14:
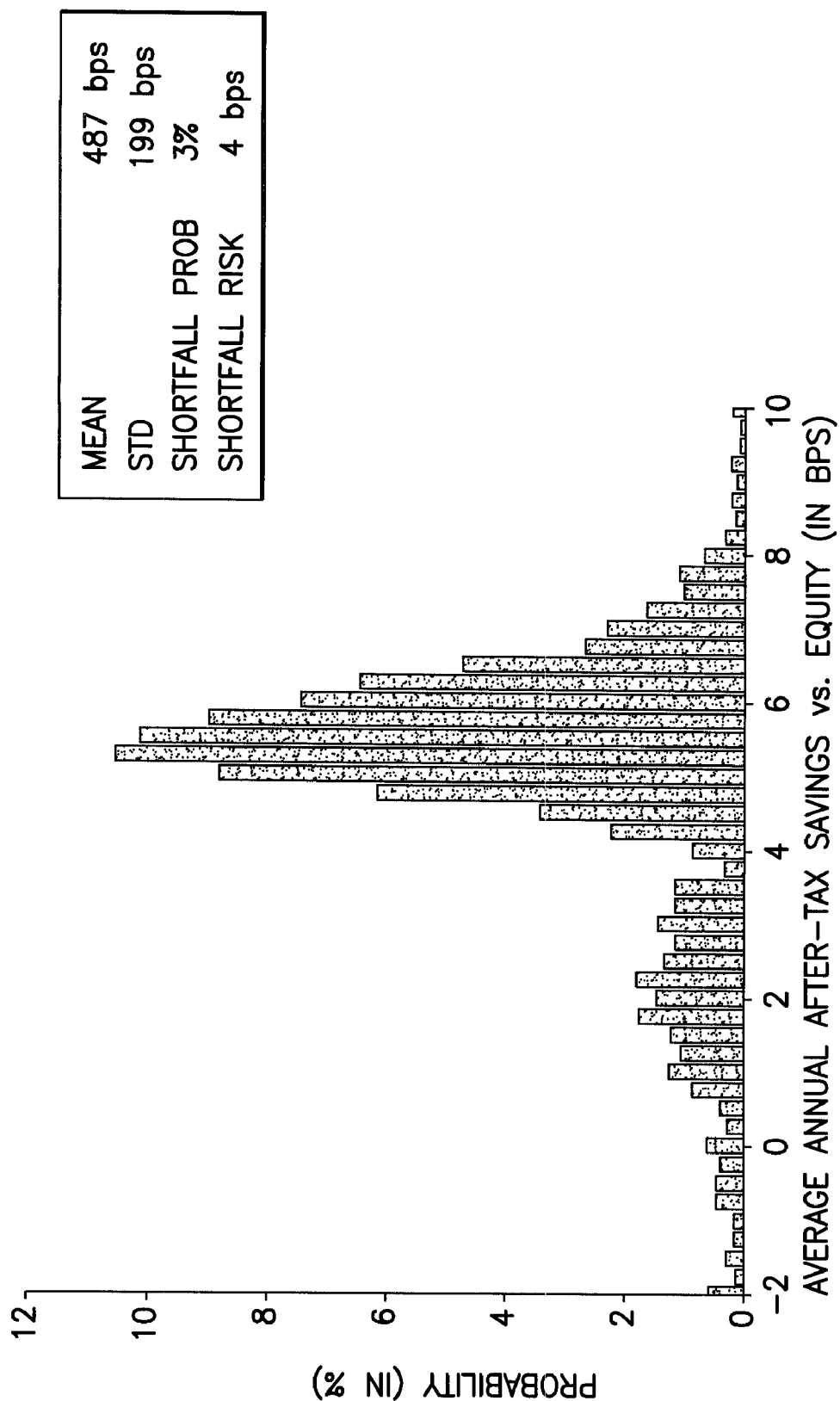
FIG. 14 shows a plot of after-tax cash flow savings vs. equity according to an embodiment of the present invention.

Unlike the cash flows of senior debt, which are fixed, the cash flows of equity are equal to the dividends on the shares, which differ depending upon the scenario. To compare STARZ with equity, it is necessary to compare their cash flows on a scenario-by-scenario basis. FIG. 14 shows the distribution of average annual after-tax cash flows savings that STARZ offer compared with equity. The after-tax cash flow savings compared with equity is striking, averaging 487 bps and falling below zero less than 3% of the time. The shortfall risk is less only 4 bps. The after-tax cash flows for debt, equity, and some Contingent Convertibles are summarized in Table 12, below.

TABLE 12

After-Tax Cash Flows

| Instrument | Mean | Std |
|---|---|---|
| Debt | 4.55% | 0.00% |
| Equity | 3.69% | 1.31% |
| STARZ | −1.18% | 1.33% |
| CARZ | −0.72% | 1.25% |
| TUBZ | 1.13% | 0.74% |
| CUBZ | 2.43% | 0.68% |
| PLANZ | 2.45% | 0.62% |

Figure 15:
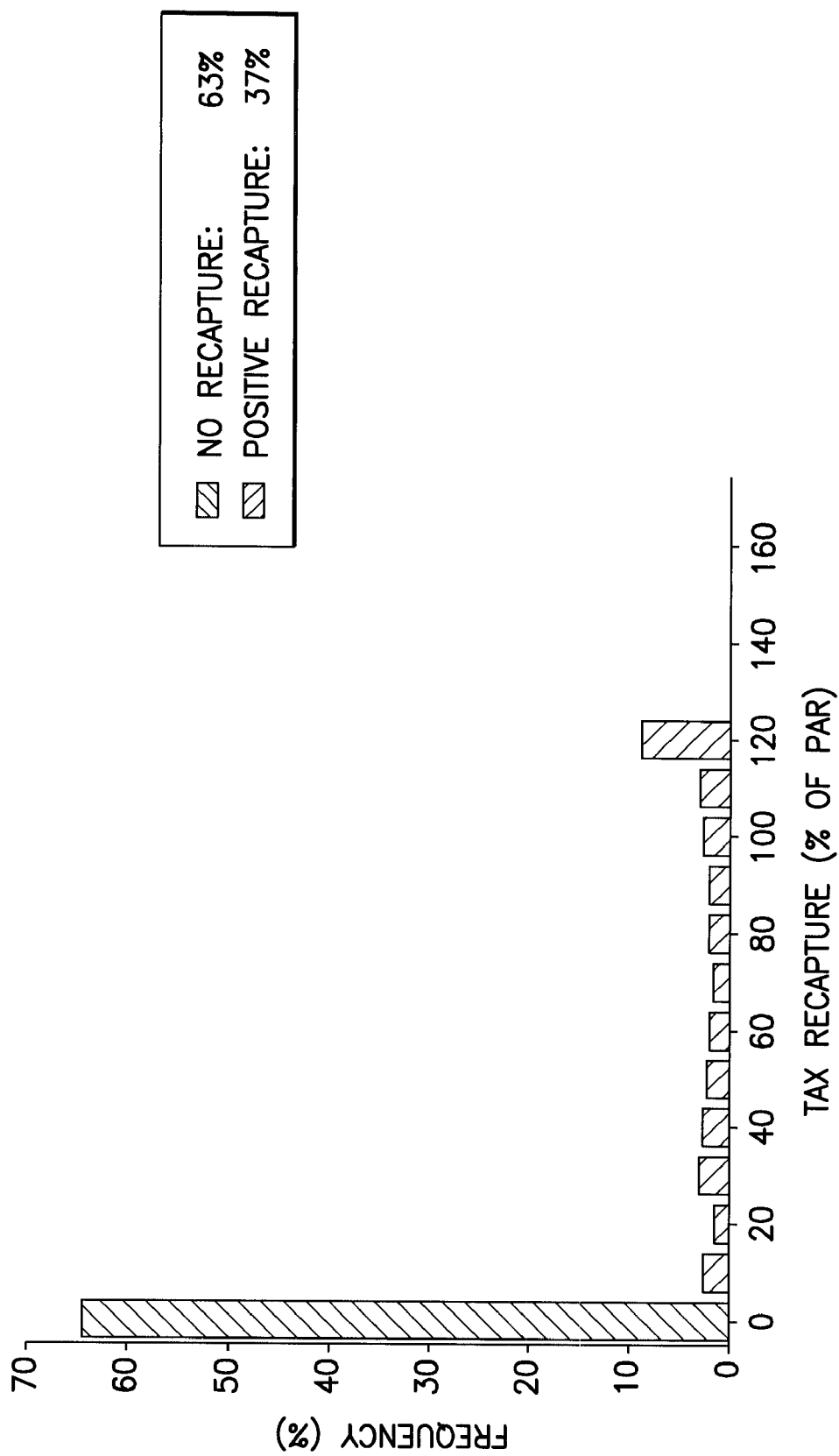
FIG. 15 shows a plot of STARZ tax recapture according to an embodiment of the present invention.

By focusing on average annual cash flows, this methodology has captured the average behavior over time, but has not fully represented the potential lumpiness of those cash flows over time. Cash flows may in fact be lumpy because some of the tax savings accrued over the life of a contingent convertible may have to be returned, in the form of tax recapture, upon termination. The effect of tax recapture has been incorporated in computing the average annual cash flows. In order to provide more detail on the timing of the STARZ cash flows, its tax recapture cash flows are broken out in FIG. 15. In most cases, the stock price is higher than the projected tax basis and no tax recapture is warranted.

After-tax cash flows capture only part of the economics of debt, equity and convertibles and should not be misinterpreted as cost. Cash flows do not capture the distinction between the payment of principal at maturity and the conversion into shares.

The discussion will now turn to equity perspective and dilution. Addressing contingent structures next from the equity perspective, the discussion will focus on dilution. As noted above, in this example there is a very high probability that CARZ holders ultimately become shareholders, and will therefore own a share of the equity of the company, including any accumulated retained earnings. Due to the contingent coupon, CARZ holders also receive a share of any earnings distributed in the form of contingent coupons that are economically equivalent to dividends. Debt, equity and STARZ have significantly different dilution effects. Assuming the facts for Company XYZ, raising $1000 of each has the following dilution effect (To raise $1000 through the STARZ strategy, XYZ must issue a CARZ with $1111 (=$1000/90%) principal):

Debt does not dilute.

Equity dilutes by 12.5 shares (=$1000/$80).

The STARZ strategy has two elements of dilution. The underlying CARZ dilutes by zero shares if not converted, by 12.3 shares (=$1111/[112.5%×$80]) if converted without intervening interest adjustment, and by 4.1 shares (=$1111/[3×112.5% x $80]) if converted after interest adjustment. The variable share repurchase contract reduces the dilution by up to 2.9 shares (=$1111× 2.6/$1000) when the share price in year 5 is greater than the conversion price on the CARZ.

Figure 16:
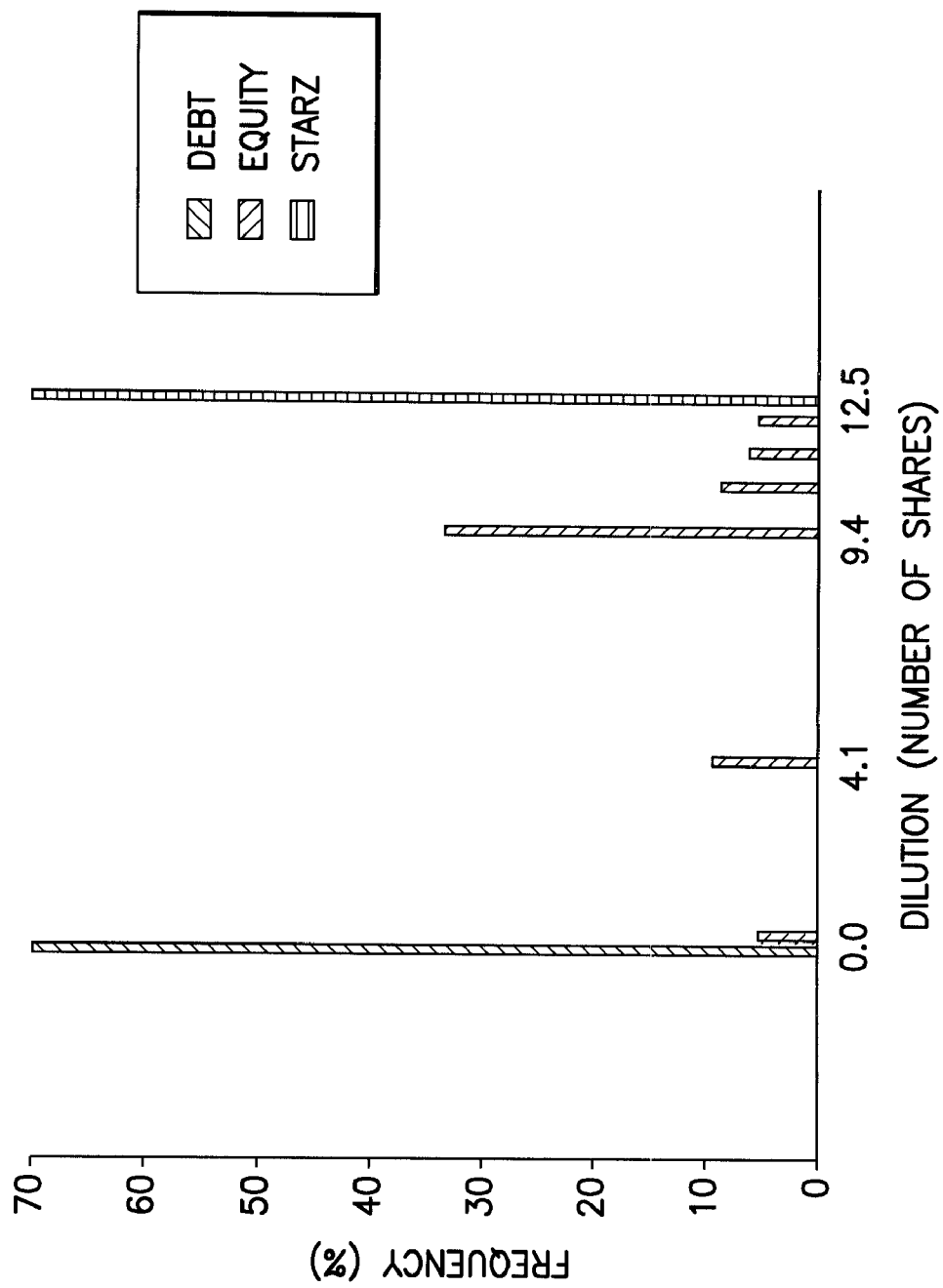
FIG. 16 shows a plot of dilution according to an embodiment of the present invention.

While the dilution impact of debt and equity is fixed and certain, the impact of STARZ is not. FIG. 16 shows the distribution of the increase in shares for each instrument. STARZ behave very much like equity but result in not only smaller expected after-tax cash flows but also less dilution. Compared with debt, the extra dilution of STARZ should be regarded as an additional cost, which could outweigh the after-tax cash flow savings of the instrument.

The discussion will now turn to combined perspective and EEPS. More particularly, cash flows and dilution offer two perspectives on the contingent structures that yield insight into their properties in comparison to debt and equity. However, with two metrics, it remains difficult to rank these alternatives based upon their "all-in" cost/risk trade-off. One embodiment of the present invention relates to a quantitative framework based upon EEPS that is both intuitive and implementable, and yet firmly grounded in modern finance theory. EEPS provides a single metric for comparing both the cost and risk of debt, equity, and hybrid equity alternatives all in the same unifying framework. EEPS measures how much of each period's income each existing shareholder is entitled to. For simple capital structures, the EEPS calculation of an embodiment of the present invention is essentially no different than the basic EPS calculation: adding debt lowers earnings, the numerator in the calculation; while adding equity raises the number of shares, the denominator. EEPS is lowered in either case, but through very different mechanisms (The money raised by either form of financing would presumably be deployed to increase EEPS through investment, liability management, or share repurchase).

With hybrids, it is important to make a distinction between EEPS and reported EPS. For financial reporting, it is believed that, depending upon the structure, issuers determine dilution caused by contingent convertibles using either the "treasury stock" method or the "if-converted" method. For the purposes of evaluating economics, the EEPS metric of the present invention recognizes that contingent convertibles: (1) reduce the income that is available to shareholders, like debt; and (2) increase the number of claims on that income, like equity.

To illustrate this framework, the discussion will again consider Company XYZ, making the additional assumptions shown in Table 13

TABLE 13

Company XYZ Capital Structure and EEPS Before Restructuring

Capital Structure

| | |
|---|---|
| Number of Shares | 50 MM |
| Share Price | $80 |
| Equity | $4000 MM |
| Debt | $2000 MM |
| Average Annual Earnings | |
| Earnings | $250 MM |
| Earnings Risk | $35 MM |
| EEPS | $5.00 |
| EEPS Risk | $0.70 |

Figure 17:
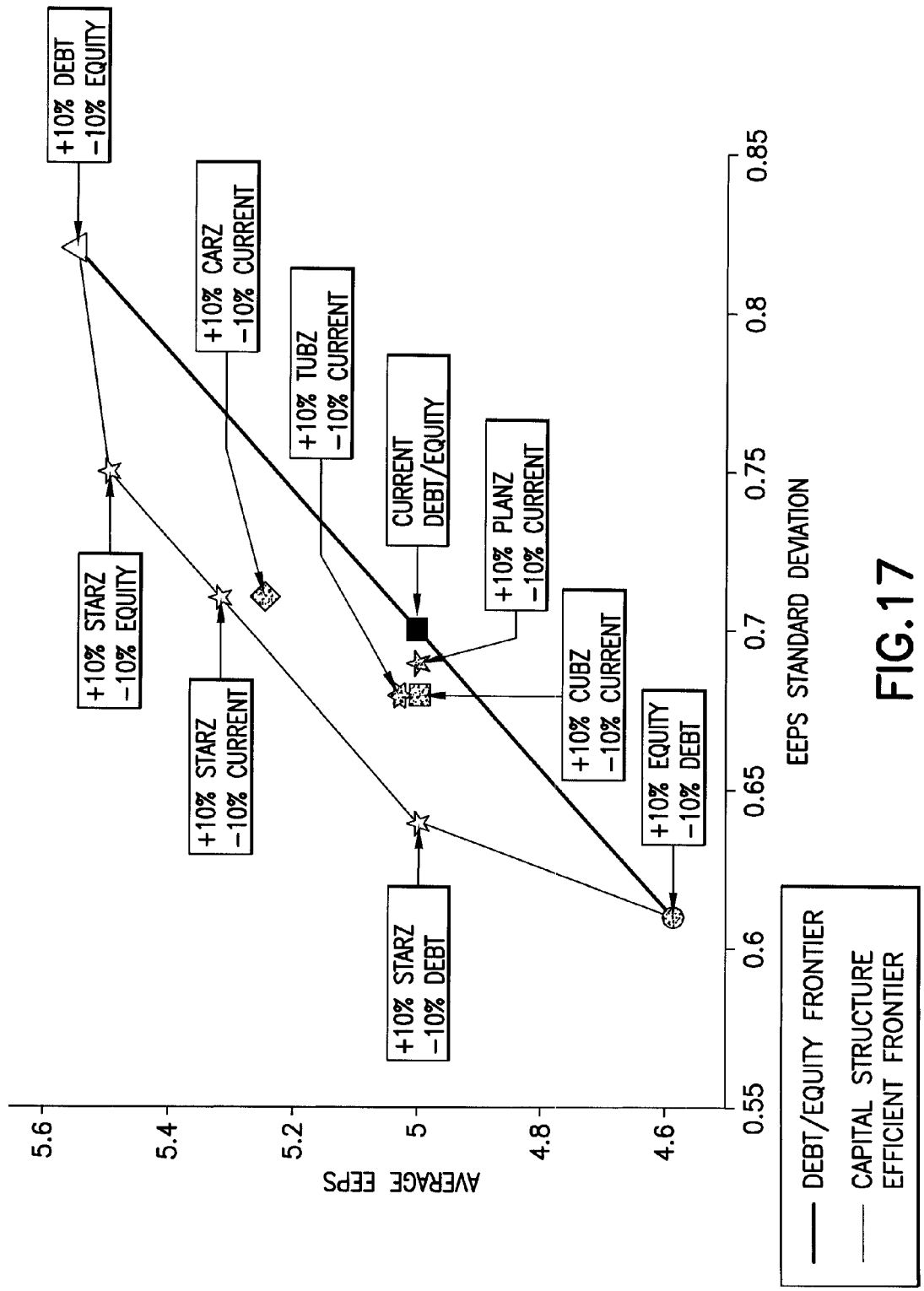
FIG. 17 shows a plot of a capital structure efficient frontier according to an embodiment of the present invention.

Strategies are compared in which Company XYZ restructures 10% of its capital by raising $600 million and using the proceeds to repurchase existing equity or debt. FIG. 17 shows EEPS and EEPS risk of STARZ, CARZ, TUBZ and CUBZ, and compares these with debt and equity issuance. Except for the Zero-coupon and Zero-put securities, restructuring alternatives essentially fall along a line that defines the debt/equity Capital Structure Efficient Frontier. Along this Capital Structure Efficient Frontier the trade-off between EEPS and EEPS risk is roughly constant. Both Zero-coupon and Zero-put convertibles expand the Capital Structure Efficient Frontier, offering a trade-off superior to those on the debt/equity Capital Structure Efficient Frontier. Compared with the current capital structure in this example, replacing a combination of debt and equity with contingent convertibles boosts EEPS essentially without increasing EEPS risk. Compared with equity, these instruments result in much higher EEPS and only slightly higher EEPS risk, while compared with debt, they result in lower EEPS risk and only slightly lower EEPS. These quantitative EEPS findings confirm the qualitative intuition developed when viewing the structure from the debt and equity perspectives. The results are summarized in Table 14, below, where the EEPS shortfall risk is also calculated.

TABLE 14

Company XYZ's EEPS After Restructuring

| | EEPS Statistics ($) | | |
|---|---|---|---|
| Strategy | Average | STD | Shortfall Risk |
| CURRENT CAPITAL STRUCTURE | 5.00 | 0.70 | 0.24 |
| +10% EQUITY −10% DEBT | 4.82 | 0.61 | 0.34 |
| +10% DEBT −10% EQUITY | 5.24 | 0.82 | 0.22 |
| +10% STARZ −10% CURRENT | 5.59 | 0.72 | 0.08 |
| +10% STARZ −10% DEBT | 5.41 | 0.65 | 0.10 |
| +10% STARZ −10% EQUITY | 5.69 | 0.76 | 0.07 |
| +10% CARZ −10% CURRENT | 5.50 | 0.70 | 0.10 |
| +10% TUBZ −10% CURRENT | 5.18 | 0.68 | 0.19 |
| +10% PLANZ −10% CURRENT | 5.00 | 0.69 | 0.28 |
| +10% CUBZ −10% CURRENT | 5.11 | 0.69 | 0.23 |

Figure 18:
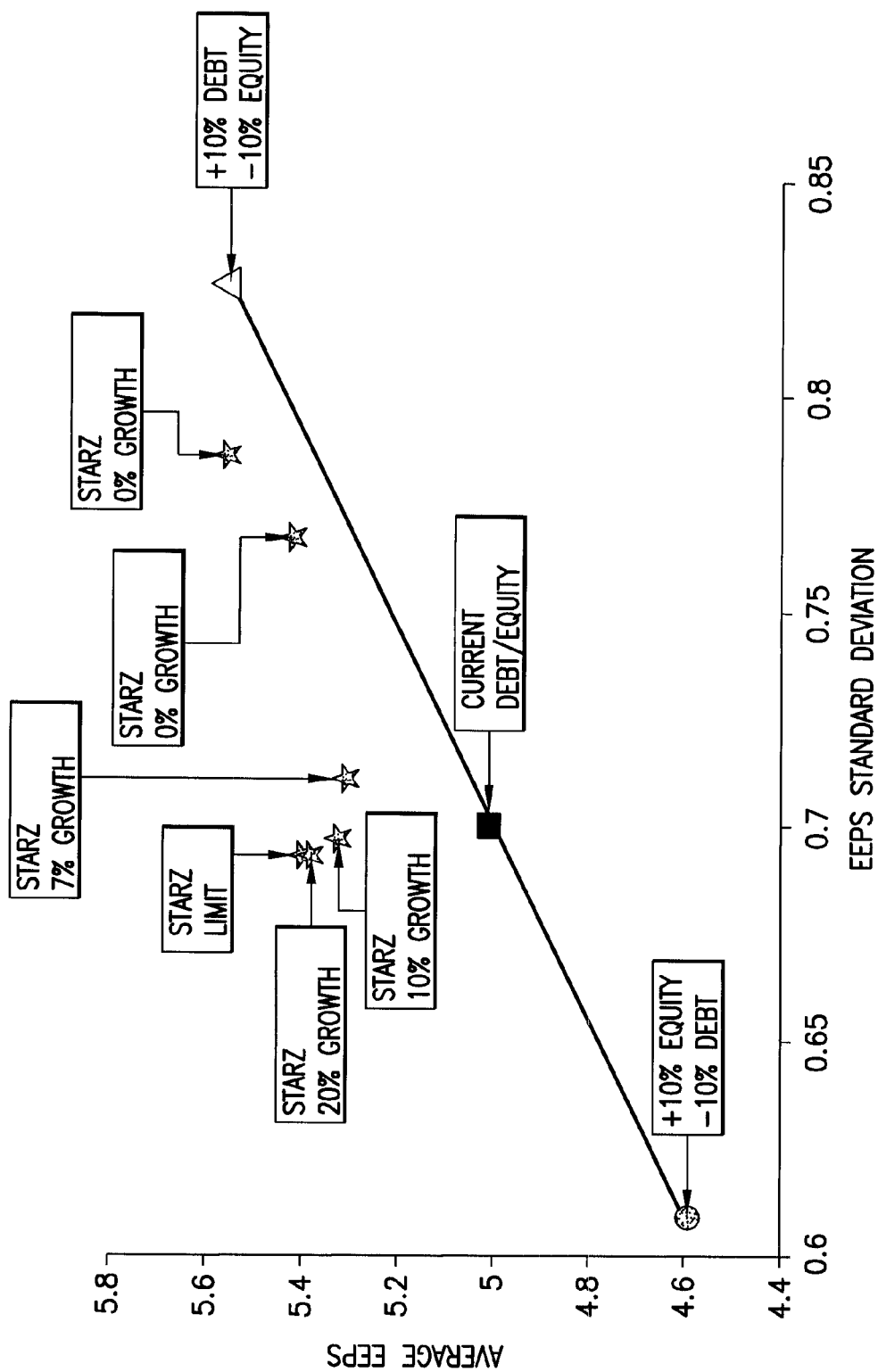
FIG. 18 shows a plot of sensitivity to stock price growth rate according to an embodiment of the present invention.

The economics of financing share repurchase with contingent convertibles depends upon the assumed growth rate of the share price. Sensitivity analyses were performed to determine whether, at certain growth rates, STARZ become unattractive relative to other alternatives (see FIG. 18). As expected, that even at very high growth rates, STARZ simply behave asymptotically like the underlying shares, but with tax-deductible dividends. The net result of the repurchase is a slight reduction in shares outstanding and an increase in income available to common shareholders. This combination essentially guarantees that at any growth rate, STARZ-financed share repurchase outperforms any strategy based upon debt and equity alone.

Accordingly, as discussed above, contingent convertibles offer a tremendous opportunity for issuers to raise funds in a way that is more attractive from an economic cost/risk perspective than combinations of debt and equity. These securities are not only attractive on a cash flow basis in comparison to senior debt and equity, but also significantly expand the Capital Structure Efficient Frontier when viewed in an economic EPS perspective. They provide advantages of both debt and equity and provide corporate CFO's and treasurers with the means of truly optimizing their capital structure.

In another embodiment, the Economic EPS framework/methodology can account for the differences in risk between debt and equity as well as provide a unifying framework for analyzing and comparing the broader set of hybrid alternatives along the debt/equity continuum.

In another embodiment, P/E Ratio is a measure of EPS risk: lower P/E means higher EPS risk.
  Perpetuity: P/E ratio=1/Return on Equity
  CAPM: Return on Equity=Risk Free Return+Equity Beta× Market Risk Premium
  Beta=Correlation×Equity Return Risk/Market Return Risk
  EPS Risk=Equity Return Risk×Price In another embodiment, if shareholders receive some value from tax shields, are not charged too much by creditors for the cost of financial distress, or benefit from market mispricing, then EPS can be increased with a smaller increase in EPS risk than predicted by Modigliani Miller.

In another embodiment, the Monte Carlo simulation may propogate a random variable over time, may create and/or utilize a probability distribution of Economic EPS, and/or may be utilized in the context of determining which scenario will give the highest EPS (e.g., Economic EPS) per unit risk of EPS (e.g., Economic EPS).

In another embodiment, the present invention relates to a methodology for decomposing an instrument (e.g., a security) into a debt component and an equity component (e.g., in the context of EPS).

In another embodiment, the retained EPS component of Economic EPS may equal: (earnings without taking effect of any interest expense from the equity-related security minus attributed after-tax interest expense from the equity-related security) divided by (the number of common shares plus the number of attributed shares from the equity related security).

In another embodiment, Economic EPS may result in net accretion from a purchased variable share repurchase contract (e.g., for a low P/E issuer).

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive.

What is claimed is:

1. A method implemented by a programmed computer system for characterizing earnings of an entity, comprising:
    obtaining, at the computer system, data associated with the entity including a number of common shares outstanding, a value of earnings, a value of dividends per share, a value of coupon payments, and a change in the effective number of common shares outstanding, which change in the effective number of common shares outstanding reflects the possibility, based upon an economically reasonable analysis in light of market conditions including a value of a stock price associated with the entity, of conversion of a convertible security;
    iteratively calculating, with the computer system, a plurality of values of earnings per share associated with the entity based upon the obtained data and by iteratively changing the value of the stock price associated with the entity, wherein each value of earnings per share is calculated at least in part using the formula:

$$EPS = DPS_0 + \frac{Earnings_0 - N_o x \ DPS_0 - Coupon}{N_o + \Delta N_{\mathit{eff}}},$$

wherein:
        i) $Earnings_0$ equals the obtained value of earnings,
        ii) $N_0$ equals the obtained number of common shares outstanding,
        iii) $DPS_0$ equals the obtained value of dividends per share,
        iv) Coupon equals the obtained value of coupon payments, and
        v) $\Delta N_{\mathit{eff}}$ equals the obtained change in the effective number of common shares outstanding, based at least in part upon each iteratively changed value of the stock price associated with the entity,
    iteratively calculating, with the computer system, a plurality of values of earnings per share risk associated with the entity, wherein the values of earnings per share risk are based upon at least a plurality of different numbers of shares outstanding and an amount of earnings volatility;
    recording, with the computer system, the calculated earnings per share values associated with the entity and the calculated earnings per share risk values associated with the entity; and
    outputting, with the computer system, the recorded calculated earnings per share values associated with the entity and the recorded calculated earnings per share risk values associated with the entity.

2. The method of claim 1, wherein the entity is a public corporation.

3. The method of claim 2, wherein at least one of the calculated earnings per share values and the calculated earnings per share risk values is applied to a financial presentation relating to at least one of a balance sheet and an earnings per share metric.

4. The method of claim 1, wherein the iterations and calculations are carried out at least in part using a Monte Carlo simulation.

5. The method of claim 1, wherein the calculated earnings per share values and the calculated earnings per share risk values are plotted against one another.

6. The method of claim 5, wherein the plot of calculated earnings per share values versus calculated earnings per share risk values is credit adjusted.

7. The method of claim 1, wherein the economically reasonable analysis in light of market conditions takes into account a conversion premium associated with the convertible security.

8. A method implemented by a programmed computer system for characterizing earnings of an entity, comprising:
    obtaining, at the computer system, data associated with the entity including a number of existing shares, a value of earnings, a value of an equity dividend, a value of an attributed after-tax interest expense from a convertible security, and a number of attributed shares from the convertible security, which number of attributed shares reflects the possibility, based upon an economically reasonable analysis in light of market conditions including a value of a stock price associated with the entity, of conversion of the convertible security;
    iteratively calculating, with the computer system, a plurality of values of earnings per share associated with the entity based upon the obtained data, wherein each value of earnings per share is calculated at least in part using the formula:

EPS =dividend per share +retained EPS;

wherein dividend per share =the value of the equity dividend / the number of existing shares; and
    wherein retained EPS =(earnings without taking effect of any interest expense from the convertible security minus attributed after-tax interest expense from the convertible security)/(the number of existing shares plus the number of attributed shares from the convertible security);
    iteratively calculating, with the computer system, a plurality of values of earnings per share risk associated with the entity, wherein the values of earnings per share risk are based upon at least a plurality of different numbers of shares outstanding and an amount of earnings volatility;
    recording, with the computer system, the calculated earnings per share values associated with the entity and the calculated earnings per share risk values associated with the entity; and
    outputting, with the computer system, the recorded calculated earnings per share values associated with the entity and the recorded calculated earnings per share risk values associated with the entity;
    wherein the iterative calculating the plurality of values of earnings per share is carried out by iteratively changing at least the value of the stock price associated with the entity.

9. The method of claim 8, wherein the entity is a public corporation.

10. The method of claim 9, wherein at least one of the calculated earnings per share values and the calculated earnings per share risk values is applied to a financial presentation relating to at least one of a balance sheet and an earnings per share metric.

11. The method of claim 8, wherein the iterations and calculations are carried out at least in part using a Monte Carlo simulation.

12. The method of claim 8, wherein the calculated earnings per share values and the calculated earnings per share risk values are plotted against one another.

13. The method of claim 12, wherein the plot of calculated earnings per share values versus calculated earnings per share risk values is credit adjusted.

14. The method of claim 8, wherein the economically reasonable analysis in light of market conditions takes into account a conversion premium associated with the convertible security.

* * * * *